(12) United States Patent
Wang et al.

(10) Patent No.: US 11,474,224 B2
(45) Date of Patent: *Oct. 18, 2022

(54) DETECTION SYSTEM

(71) Applicant: Aptiv Technologies Limited, St. Michael (BB)

(72) Inventors: Yu Wang, Troy, MI (US); Liang Ma, Rochester Hills, MI (US); Robert J. Cashler, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,301

(22) Filed: Jan. 25, 2021

(65) Prior Publication Data

US 2021/0141075 A1  May 13, 2021

Related U.S. Application Data

(63) Continuation of application No. 15/840,321, filed on Dec. 13, 2017, now Pat. No. 10,955,540.

(Continued)

(51) Int. Cl.
*G01S 13/08* (2006.01)
*G01S 17/08* (2006.01)
(Continued)

(52) U.S. Cl.
CPC .............. *G01S 13/08* (2013.01); *B60D 1/245* (2013.01); *G01S 7/2927* (2013.01); *G01S 7/411* (2013.01);
(Continued)

(58) Field of Classification Search
None
See application file for complete search history.

(56) References Cited

U.S. PATENT DOCUMENTS 5,361,072 A  11/1994  Barrick et al.
5,517,196 A  5/1996  Pakett et al.
(Continued)

FOREIGN PATENT DOCUMENTS

CN  1559842  1/2005
CN  101268383  9/2008
(Continued)

OTHER PUBLICATIONS

"Corrected Notice of Allowane", U.S. Appl. No. 15/840,321, filed Feb. 16, 2021, 3 pages.
(Continued)

*Primary Examiner* — Whitney Moore
(74) *Attorney, Agent, or Firm* — Sawtooth Patent Group PLLC

(57) ABSTRACT

Disclosed are systems that include a controller circuit in communication with a ranging sensor configured to detect objects proximate to a host vehicle. In an aspect, the controller circuit is configured to perform a first detection count of the detected objects, determine a first group of objects of the detected objects, determine a first distance to the first group of objects, utilize the first distance to determine a trailer distance between the host vehicle and a front of a trailer, determine a second group of objects of the detected objects, determine a second distance to the second group of objects, utilize the second distance to determine an axle distance between the front of the trailer and a trailer axle, and determine a trailer length based on the trailer distance and the axle distance. Methods are also disclosed.

20 Claims, 15 Drawing Sheets

Related U.S. Application Data

(60) Provisional application No. 62/593,418, filed on Dec. 1, 2017.

(51) Int. Cl.

| | | |
|---|---|---|
| *G01S 7/48* | (2006.01) | |
| *G01S 7/41* | (2006.01) | |
| *G01S 13/88* | (2006.01) | |
| *G01S 7/292* | (2006.01) | |
| *G01S 13/87* | (2006.01) | |
| *B60D 1/24* | (2006.01) | |
| *G01S 17/87* | (2020.01) | |
| *G01S 17/88* | (2006.01) | |
| *G01S 13/931* | (2020.01) | |

(52) U.S. Cl.
CPC ............ *G01S 7/412* (2013.01); *G01S 7/4802* (2013.01); *G01S 13/878* (2013.01); *G01S 13/88* (2013.01); *G01S 17/08* (2013.01); *G01S 17/87* (2013.01); *G01S 17/88* (2013.01); *G01S 2013/9323* (2020.01); *G01S 2013/93272* (2020.01)

(56) References Cited

U.S. PATENT DOCUMENTS

| | | | |
|---|---|---|---|
| 6,680,689 | B1 | 1/2004 | Zoratti |
| 6,933,837 | B2 | 8/2005 | Gunderson et al. |
| 7,786,849 | B2 | 8/2010 | Buckley |
| 7,904,222 | B2 | 3/2011 | Lee et al. |
| 8,665,078 | B2 | 3/2014 | Van Wiemeersch et al. |
| 9,211,889 | B1 | 12/2015 | Hoetzer et al. |
| 9,229,102 | B1 | 1/2016 | Wright et al. |
| 9,296,423 | B2 | 3/2016 | Rupp et al. |
| 9,373,044 | B2 | 6/2016 | Wallat et al. |
| 9,477,894 | B1 | 10/2016 | Reed et al. |
| 9,566,911 | B2 | 2/2017 | Greenwood et al. |
| 9,594,155 | B2 | 3/2017 | Cashler et al. |
| 9,796,228 | B2 | 10/2017 | Hu et al. |
| 9,804,022 | B2 | 10/2017 | Kyrtsos et al. |
| 9,910,151 | B2 | 3/2018 | Cashier |
| 9,937,953 | B2 | 4/2018 | Lavoie et al. |
| 9,975,480 | B2 | 5/2018 | Lai et al. |
| 10,207,643 | B2 | 2/2019 | Prasad et al. |
| 10,276,049 | B2 | 4/2019 | Prasad et al. |
| 10,286,916 | B2 | 5/2019 | Prasad et al. |
| 10,351,146 | B2 | 7/2019 | Prasad et al. |
| 10,393,862 | B2 | 8/2019 | Cashler et al. |
| 10,481,255 | B2 | 11/2019 | Prasad et al. |
| 10,838,054 | B2 | 11/2020 | Wang et al. |
| 10,955,540 | B2 | 3/2021 | Wang et al. |
| 11,092,668 | B2 | 8/2021 | Wang et al. |
| 2008/0169938 | A1 | 7/2008 | Madau |
| 2008/0186204 | A1 | 8/2008 | Buckley |
| 2009/0005932 | A1 | 1/2009 | Lee et al. |
| 2009/0271078 | A1 | 10/2009 | Dickinson |
| 2010/0109938 | A1 | 5/2010 | Oswald et al. |
| 2011/0140872 | A1 | 6/2011 | McClure |
| 2011/0257860 | A1 | 10/2011 | Getman et al. |
| 2012/0041659 | A1 | 2/2012 | Greene |
| 2012/0169523 | A1 | 7/2012 | Lee et al. |
| 2013/0027195 | A1 | 1/2013 | Van Wiemeersch et al. |
| 2013/0169425 | A1 | 7/2013 | Victor et al. |
| 2013/0176161 | A1 | 7/2013 | Derham et al. |
| 2013/0222592 | A1 | 8/2013 | Gieseke |
| 2013/0226390 | A1 | 8/2013 | Luo et al. |
| 2013/0251194 | A1 | 9/2013 | Schamp |
| 2014/0085472 | A1 | 3/2014 | Lu et al. |
| 2014/0160276 | A1 | 6/2014 | Pliefke et al. |
| 2014/0160279 | A1 | 6/2014 | Pliefke et al. |
| 2014/0176716 | A1 | 6/2014 | Wallat et al. |
| 2014/0218522 | A1 | 8/2014 | Lavoie et al. |
| 2014/0222288 | A1 | 8/2014 | Lavoie et al. |
| 2014/0267688 | A1 | 9/2014 | Aich et al. |
| 2014/0267689 | A1 | 9/2014 | Lavoie |
| 2014/0277942 | A1 | 9/2014 | Kyrtsos et al. |
| 2014/0303849 | A1 | 10/2014 | Hafner et al. |
| 2015/0120141 | A1 | 4/2015 | Lavoie et al. |
| 2016/0041258 | A1 | 2/2016 | Cashler et al. |
| 2016/0084943 | A1 | 3/2016 | Arage |
| 2016/0098604 | A1 | 4/2016 | Min |
| 2016/0101811 | A1 | 4/2016 | Kyrtsos et al. |
| 2016/0153778 | A1 | 6/2016 | Singh et al. |
| 2016/0167651 | A1 | 6/2016 | Schwindt et al. |
| 2016/0203374 | A1 | 7/2016 | Zeng et al. |
| 2016/0209211 | A1 | 7/2016 | Song et al. |
| 2016/0252610 | A1 | 9/2016 | Smith et al. |
| 2016/0297361 | A1 | 10/2016 | Drazan et al. |
| 2017/0001566 | A1 | 1/2017 | Lu et al. |
| 2017/0080928 | A1 | 3/2017 | Wasiek et al. |
| 2017/0177949 | A1 | 6/2017 | Hu et al. |
| 2017/0217368 | A1 | 8/2017 | Lewis et al. |
| 2017/0242443 | A1 | 8/2017 | Schuh et al. |
| 2017/0305436 | A1 | 10/2017 | Maskell et al. |
| 2017/0363727 | A1 | 12/2017 | Prasad et al. |
| 2017/0363728 | A1 | 12/2017 | Prasad et al. |
| 2018/0011172 | A1 | 1/2018 | Cashler et al. |
| 2018/0025499 | A1 | 1/2018 | Strano et al. |
| 2018/0045823 | A1 | 2/2018 | Prasad et al. |
| 2018/0061239 | A1 | 3/2018 | Prasad et al. |
| 2018/0068447 | A1 | 3/2018 | Prasad et al. |
| 2018/0068566 | A1 | 3/2018 | Prasad et al. |
| 2018/0203106 | A1 | 7/2018 | Di et al. |
| 2019/0033442 | A1 | 1/2019 | Millar et al. |
| 2019/0086204 | A1 | 3/2019 | Critchley et al. |
| 2019/0170867 | A1 | 6/2019 | Wang et al. |
| 2019/0228258 | A1 | 7/2019 | Bell et al. |
| 2019/0232964 | A1 | 8/2019 | Lindholm |
| 2019/0308473 | A1 | 10/2019 | Yu et al. |
| 2019/0335100 | A1 | 10/2019 | Chen et al. |
| 2019/0347498 | A1 | 11/2019 | Herman et al. |
| 2020/0079165 | A1 | 3/2020 | Niewiadomski et al. |
| 2020/0081117 | A1 | 3/2020 | Flores Tapia et al. |
| 2020/0110163 | A1 | 4/2020 | Wang et al. |
| 2020/0256953 | A1 | 8/2020 | Wang et al. |
| 2021/0011145 | A1 | 1/2021 | Wang et al. |
| 2021/0263145 | A1 | 8/2021 | Wang et al. |
| 2021/0333382 | A1 | 10/2021 | Wang et al. |

FOREIGN PATENT DOCUMENTS

| | | | |
|---|---|---|---|
| CN | 102609953 | | 7/2012 |
| CN | 203047062 | | 7/2013 |
| CN | 104890671 | | 9/2015 |
| CN | 205044655 | | 2/2016 |
| CN | 105501114 | | 4/2016 |
| DE | 19928433 | A1 | 12/2000 |
| DE | 10312548 | | 5/2004 |
| DE | 103251092 | | 1/2005 |
| DE | 1020004059596 | | 6/2006 |
| DE | 102005019550 | | 11/2006 |
| DE | 102005042729 | | 3/2007 |
| DE | 102006028625 | | 10/2007 |
| DE | 102009007990 | | 8/2012 |
| DE | 102014107917 | | 9/2015 |
| DE | 102016200642 | | 7/2017 |
| EP | 2045155 | | 4/2009 |
| EP | 2551132 | | 1/2013 |
| EP | 2942766 | | 11/2015 |
| EP | 2983006 | | 2/2016 |
| EP | 3021140 | | 5/2016 |
| EP | 3031687 | | 6/2016 |
| EP | 3267222 | | 1/2018 |
| EP | 3291205 | | 3/2018 |
| GB | 2447672 | | 9/2008 |
| GB | 2505666 | | 3/2014 |
| GB | 2518857 | | 4/2015 |
| JP | H09267762 | | 10/1997 |
| JP | 2002068032 | | 3/2002 |
| WO | 2006114206 | | 11/2006 |

(56) References Cited

FOREIGN PATENT DOCUMENTS

| WO | 2007028433 | 3/2007 |
|---|---|---|
| WO | 2016015938 | 2/2016 |

OTHER PUBLICATIONS

"Extended European Search Report", EP Application No. 21151400.5, dated Jun. 18, 2021, 12 pages.
"Notice of Allowance", U.S. Appl. No. 16/270,199, filed Jun. 11, 2021, 12 pages.
Homm, et al., "Efficient Occupancy Grid Computation on the GPU with Lidar and Radar for Road Boundary Detection", Jun. 2010, 8 pages.
"Advisory Action", U.S. Appl. No. 15/232,577, dated Feb. 6, 2019, 3 pages.
"Advisory Action", U.S. Appl. No. 15/204,071, dated Apr. 10, 2019, 3 pages.
"Advisory Action", U.S. Appl. No. 15/250,072, dated Sep. 11, 2018, 3 pages.
"Advisory Action", U.S. Appl. No. 15/257,062, dated Sep. 18, 2018, 3 pages.
"Corrected Notice of Allowability", U.S. Appl. No. 15/186,602, dated May 3, 2019, 4 pages.
"Corrected Notice of Allowance", U.S. Appl. No. 16/154,848, dated Oct. 19, 2020, 2 pages.
"Detection System", U.S. Appl. No. 15/840,321, filed Dec. 13, 2017, 40 pages.
"Detection System", U.S. Appl. No. 62/593,418, filed Dec. 1, 2017, 56 pages.
"European Search Report", EP Application No. 19199564, dated Feb. 20, 2020, 2 pages.
"European Search Report", EP Application No. 20152210, dated Mar. 23, 2020, 2 pages.
"European Search Report", EP Application No. 18208733, dated Apr. 22, 2019, 2 pages.
"European Search Report", EP Application No. 18208733, dated Sep. 6, 2019, 2 pages.
"Extended European Search Report", EP Application No. 17174836.1, dated Nov. 22, 2017, 10 pages.
"Extended European Search Report", EP Application No. 17174842.9, dated Nov. 23, 2017, 10 pages.
"Extended European Search Report", EP Application No. 17186999.3, dated Jan. 17, 2018, 7 pages.
"Extended European Search Report", EP Application No. 17187300.3, dated Jan. 17, 2018, 7 pages.
"Extended European Search Report", EP Application No. 17176204.0, dated Dec. 8, 2017, 7 pages.
"Extended European Search Report", EP Application No. 17184001.0, dated Jan. 12, 2018, 8 pages.
"Extended European Search Report", EP Application No. 17188610.4, dated Feb. 13, 2018, 8 pages.
"Final Office Action", U.S. Appl. No. 15/186,602, dated Jan. 14, 2019, 10 pages.
"Final Office Action", U.S. Appl. No. 15/259,126, dated Jun. 1, 2018, 14 pages.
"Final Office Action", U.S. Appl. No. 15/257,062, dated Jul. 13, 2018, 7 pages.
"Final Office Action", U.S. Appl. No. 15/204,071, dated Dec. 17, 2018, 7 pages.
"Final Office Action", U.S. Appl. No. 15/232,577, dated Nov. 26, 2018, 8 pages.
"Final Office Action", U.S. Appl. No. 15/250,072, dated Jul. 16, 2018, 9 pages.
"Foreign Office Action", CN Application No. 201710542068.6, dated Mar. 9, 2020, 12 pages.
"Foreign Office Action", CN Application No. 201710464625.7, dated Jul. 11, 2019, 12 pages.
"Foreign Office Action", CN Application No. 201710806769.6, dated Jun. 9, 2020, 17 pages.
"Foreign Office Action", CN Application No. 201710464962.6, dated Mar. 10, 2020, 18 pages.
"Foreign Office Action", CN Application No. 201710806769.6, dated Dec. 4, 2019, 20 pages.
"Foreign Office Action", EP Application No. 17187300.3, dated May 14, 2020, 4 pages.
"Foreign Office Action", CN Application No. 201710464625.7, dated Jun. 17, 2020, 9 pages.
"Non-Final Office Action", U.S. Appl. No. 15/250,072, dated Mar. 27, 2018, 10 pages.
"Non-Final Office Action", U.S. Appl. No. 15/232,577, dated Mar. 28, 2019, 10 pages.
"Non-Final Office Action", U.S. Appl. No. 15/186,602, dated Jul. 19, 2018, 10 pages.
"Non-Final Office Action", U.S. Appl. No. 15/259,126, dated Jan. 18, 2018, 12 pages.
"Non-Final Office Action", U.S. Appl. No. 15/204,071, dated Jul. 19, 2018, 6 pages.
"Non-Final Office Action", U.S. Appl. No. 15/257,062, dated Feb. 7, 2018, 7 pages.
"Non-Final Office Action", U.S. Appl. No. 15/186,601, dated May 29, 2018, 7 pages.
"Non-Final Office Action", U.S. Appl. No. 15/232,577, dated Jun. 8, 2018, 7 pages.
"Non-Final Office Action", U.S. Appl. No. 17/037,307, dated Oct. 23, 2020, 7 pages.
"Non-Final Office Action", U.S. Appl. No. 15/840,321, dated Apr. 28, 2020, 9 pages.
"Notice of Allowance", U.S. Appl. No. 15/840,321, dated Sep. 10, 2020, 10 pages.
"Notice of Allowance", U.S. Appl. No. 15/250,072, dated Jan. 2, 2019, 5 pages.
"Notice of Allowance", U.S. Appl. No. 15/186,601, dated Jan. 18, 2019, 7 pages.
"Notice of Allowance", U.S. Appl. No. 15/186,602, dated Mar. 20, 2019, 7 pages.
"Notice of Allowance", U.S. Appl. No. 15/232,577, dated Jul. 17, 2019, 7 pages.
"Notice of Allowance", U.S. Appl. No. 15/204,071, dated May 21, 2019, 8 pages.
"Notice of Allowance", U.S. Appl. No. 15/840,321, dated Nov. 19, 2020, 8 pages.
"Notice of Allowance", U.S. Appl. No. 16/154,848, dated Jul. 1, 2020, 9 pages.
"Restriction Requirement", U.S. Appl. No. 15/840,321, dated Jan. 31, 2020, 6 pages.
"Trailer Detection System and Method", U.S. Appl. No. 16/270,199, filed Feb. 7, 2019, 24 pages.
Cashler, et al., "Trailer Estimation with Elevation Enhanced Sensing", U.S. Appl. No. 15/204,071, filed Jul. 7, 2016, 14 pages.
Prasad, et al., "Camera Based Trailer Detection and Tracking", U.S. Appl. No. 15/257,062, filed Sep. 6, 2017, 10 pages.
Prasad, et al., "Camera Based Trailer Identification and Blind Zone Adjustment", U.S. Appl. No. 15/250,072, filed Aug. 29, 2016, 16 pages.
Prasad, et al., "Trailer Dimension with Two Dimensional Radar and Camera", U.S. Appl. No. 15/232,577, filed Aug. 9, 2016, 12 pages.
Prasad, et al., "Trailer Estimation and Blind Spot Information System Performance Improvement", U.S. Appl. No. 15/186,601, filed Jun. 20, 2016, 18 pages.
Prasad, et al., "Trailer Estimation Improvement", U.S. Appl. No. 15/186,602, filed Jun. 20, 2016, 21 pages.
Prasad, et al., "Trailer Lane Departure Warning and Sway Alert", U.S. Appl. No. 15/259,126, filed Sep. 8, 2016, 16 pages.
"Final Office Action", U.S. Appl. No. 17/037,307, dated Mar. 4, 2021, 7 pages.
"Foreign Office Action", EP Application No. 17184001.0, dated May 3, 2021, 5 pages.
"Non-Final Office Action", U.S. Appl. No. 16/270,199, dated Mar. 16, 2021, 21 pages.
"Notice of Allowance", U.S. Appl. No. 17/037,307, dated Apr. 19, 2021, 7 pages.

(56) References Cited

OTHER PUBLICATIONS

"Extended European Search Report", EP Application No. 22172712.6, dated Aug. 2, 2022, 13 pages.

DETECTION SYSTEM

CROSS-REFERENCE TO RELATED APPLICATIONS

This application is a continuation application of U.S. application Ser. No. 15/840,321, filed Dec. 13, 2017, which in turn claims priority to U.S. Provisional Application Ser. No. 62/593,418, filed Dec. 1, 2017, the disclosures of which are incorporated herein by reference.

TECHNICAL FIELD OF INVENTION

This disclosure generally relates to a detection system, and more particularly relates to a trailer detection system.

BRIEF DESCRIPTION OF DRAWINGS

The present invention will now be described, by way of example with reference to the accompanying drawings, in which.

The reference numbers of similar elements in the embodiments shown in the various figures share the last two digits.

DETAILED DESCRIPTION

Figure 1:
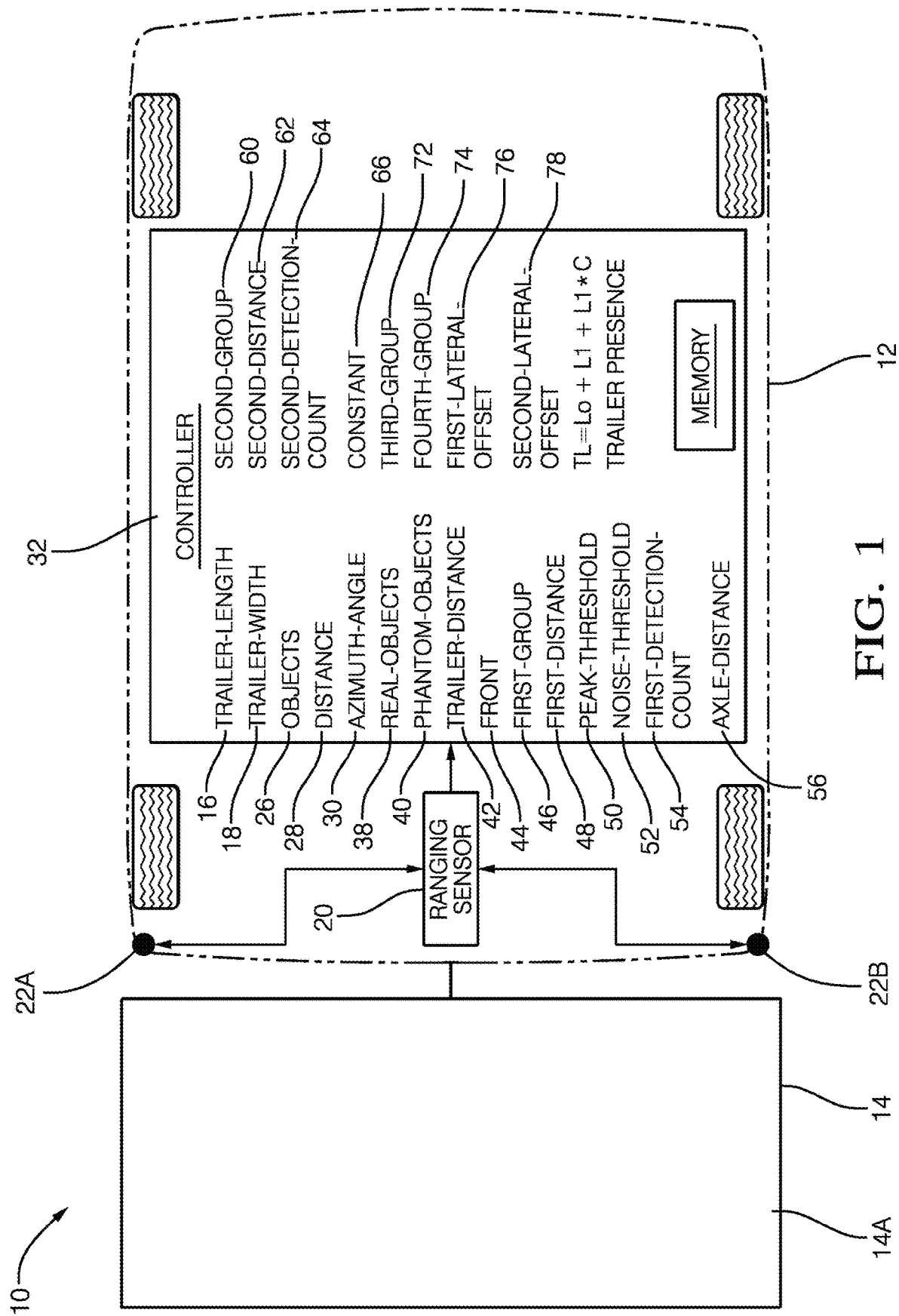
FIG. 1 is an illustration of a detection system in accordance with one embodiment.

FIG. 1 illustrates a non-limiting example of a detection system 10, hereafter referred to as the system 10, installed on a host-vehicle 12 towing a trailer 14. As will be described in more detail below, the system 10 in an improvement over other detection systems because the system 10 estimates a trailer-length 16 and trailer-width 18 based on detected targets by filtering out erroneous detections. The system 10 provides the technical benefit of enabling an adjustment of a blind zone of the host-vehicle 12 based on the size of the trailer 14, improving safety for the driver and other vehicles. In some embodiments, the trailer 14 may be a cargo-trailer 14A that may be an enclosed-type with solid panels, while in other embodiments of the cargo-trailer 14A may be an open-type with an exposed frame. In the examples illustrated in FIGS. 1-5B the trailer 14 is a cargo-trailer 14A.

The system 10 includes a ranging-sensor 20. The ranging-sensor 20 may be a radar-sensor or a lidar-sensor as will be understood by those in the art. The ranging-sensor 20 is configured to detect objects 26 proximate to the host-vehicle 12. In the example illustrated in FIG. 1, the ranging-sensor 20 is a radar-sensor. The radar-sensor detects the radar-signal that is reflected by the features of the cargo-trailer 14A towed by the host-vehicle 12. Typical radar-systems on vehicles are capable of only determining a distance 28 (i.e. range) and azimuth-angle 30 to the target so may be referred to as a two-dimensional (2D) radar-system. Other radar-systems are capable of determining an elevation-angle to the target so may be referred to as a three-dimensional (3D) radar-system. In the non-limiting example illustrated in FIG. 1, the 2D radar-sensor includes a left-sensor 22A and a right-sensor 22B. It is contemplated that the teachings presented herein are applicable to both 2D radar-systems and 3-D radar-systems with one or more sensor devices, i.e. multiple instances of the radar-sensor. The radar-sensor is generally configured to detect the radar-signal that may include data indicative of the detected-target present on the cargo-trailer 14A. As used herein, the detected-target present on the cargo-trailer 14A may be a feature of the cargo-trailer 14A that is detected by the radar-sensor and tracked by a controller-circuit 32, as will be described below.

Figure 2:
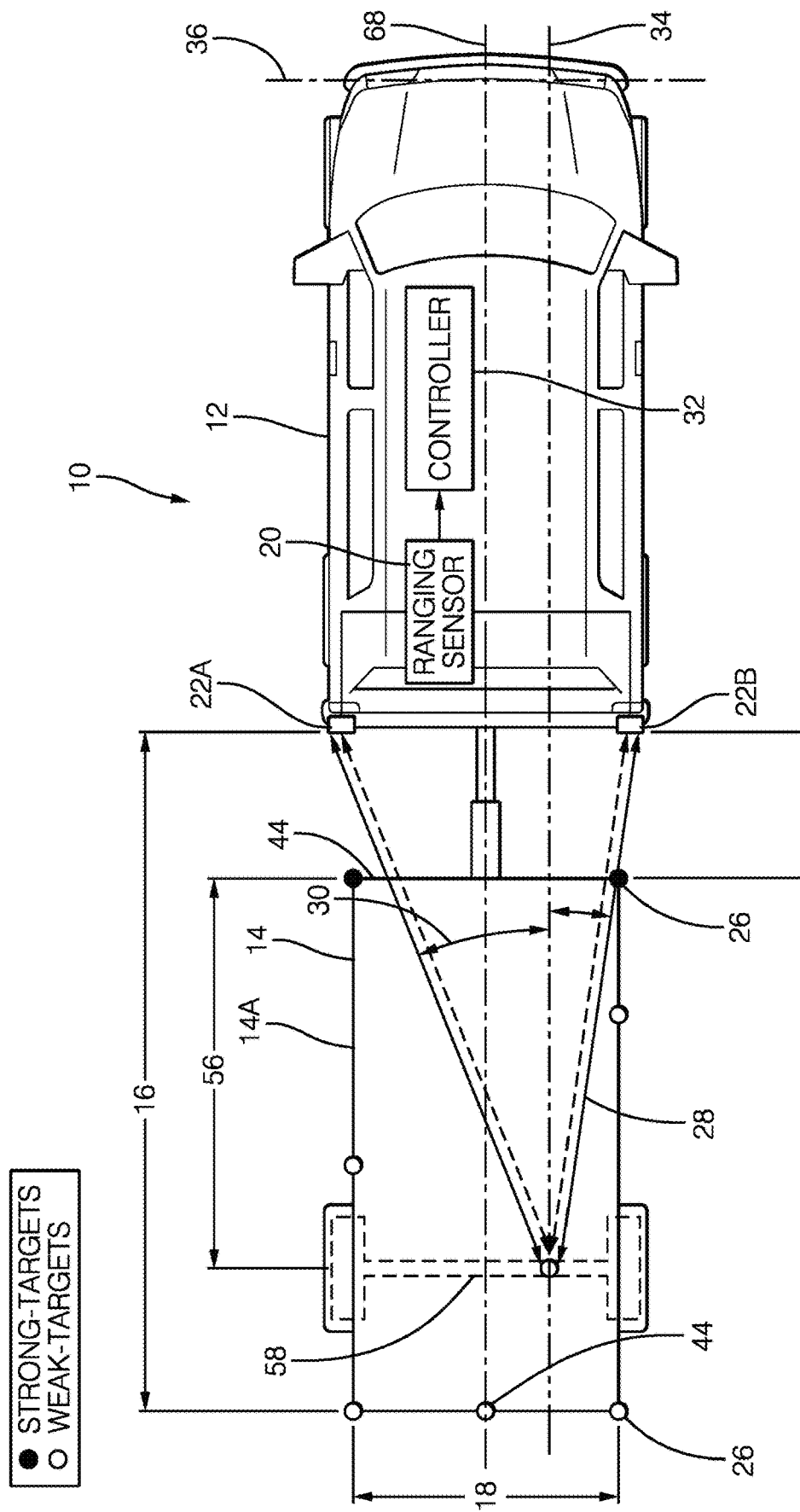
FIG. 2 is an illustration of the detection system of FIG. 1 in accordance with one embodiment.

FIG. 2 illustrates some of the types of targets located on the cargo-trailer 14A detected by the radar-sensor. By way of example and not limitation, the radar-sensor may be configured to output a continuous or periodic data stream that includes a variety of signal characteristics associated with each target detected. The signal characteristics may include or be indicative of, but are not limited to, the range to the detected-target from the host-vehicle 12, the azimuth-angle 30 to the detected-target relative to a host-vehicle-longitudinal-axis 34, an amplitude (not shown) of the radar-signal, and a relative-velocity (not shown) of closure relative to the detected-target. A target is generally detected because the radar-signal from the detected-target has sufficient signal strength to meet a predetermined threshold. That is, there may be targets that reflect the radar-signal, but the strength of the radar-signal is insufficient to be characterized as one of the detected-targets. Data that corresponds to a strong-target will generally be from consistent, non-intermittent signals. However, data that corresponds to a weak-target may be intermittent or have some substantial variability due to a low signal-to-noise ratio.

Returning to FIG. 1, the system 10 also includes the controller-circuit 32 in communication with the ranging-sensor 20. The ranging-sensor 20 may be hardwired to the controller-circuit 32 through the host-vehicle's 12 electrical-system (not shown), or may communicate through a wireless network (not shown). The controller-circuit 32 may include a processor (not shown) such as a microprocessor or other control circuitry such as analog and/or digital control circuitry including an application specific integrated circuit (ASIC) for processing data as should be evident to those in the art. The controller-circuit 32 may include a memory (not specifically shown), including non-volatile memory, such as electrically erasable programmable read-only memory (EE-PROM) for storing one or more routines, thresholds, and captured data. The one or more routines may be executed by the processor to perform steps for detecting the objects 26 based on signals received by the controller-circuit 32 from the ranging-sensor 20 as described herein. The controller-circuit 32 is configured to determine that the cargo-trailer 14A is being towed by the host-vehicle 12 (i.e. determine a trailer-presence) using the known methods of zero-range-rate (ZRR) detection of targets that will be understood by those in the art.

Figure 3A:
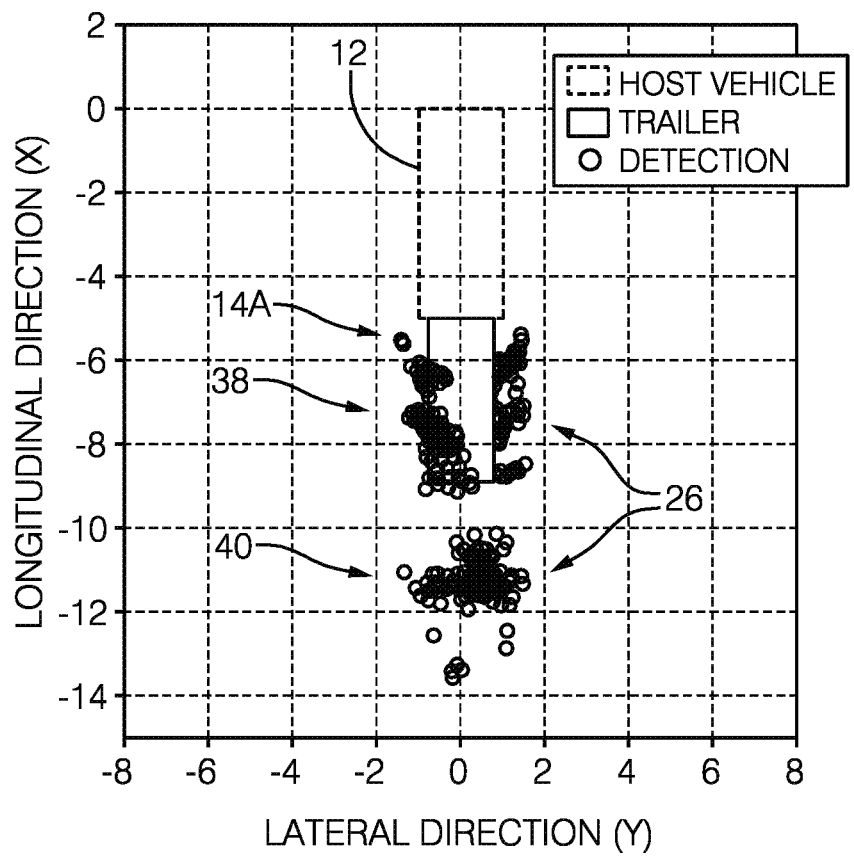
FIG. 3A is a plot of objects detected by the detection system of FIG. 1 in accordance with one embodiment.

FIG. 3A illustrates a plot of multiple radar-sensor data acquisition cycles that locate the ZRR targets along the host-vehicle-longitudinal-axis 34 and a host-vehicle-lateral-axis 36. Each data acquisition cycle consists of 64-detections per radar-sensor within a time interval of 50-milliseconds (50 ms), or a total of 128-detections for the two radar-sensors 22A and 22B. The data may be filtered to reduce noise by any of the known filtering methods, and in FIG. 3A the data has been filtered to 64-detections for the two radar-sensors 22A and 22B. The origin of the plot is located at a center of the host-vehicle's 12 front-bumper.

Figure 3B:
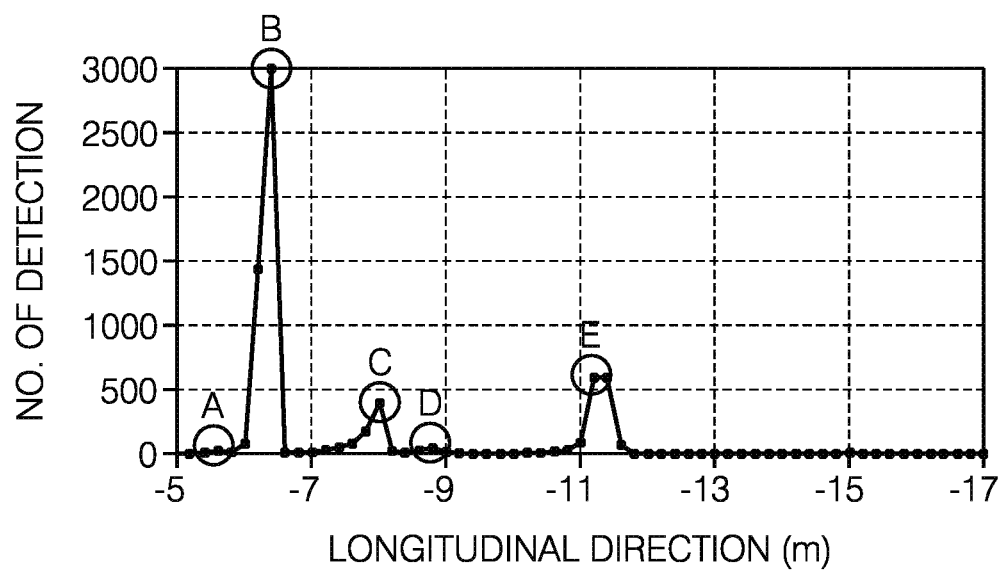
FIG. 3B is a plot of the objects of FIG. 3A in a longitudinal direction in accordance with one embodiment.

FIG. 3B illustrates a plot of the groups of the ZRR targets from FIG. 3A along the host-vehicle-longitudinal-axis 34 only. The groups represent the ZRR targets detected in increments of 0.2 meters (0.2 m) extending from a rear-end of the host-vehicle 12. For example, every 10 points along the x-axis of the plot in FIG. 3B represents 2.0 m of distance 28 from the rear-end of the 5 m long host-vehicle 12. The Y-axis in FIG. 3B represents the number of detections in a group. A total of 5 separate groups of detections are indicated by peaks in the plot and are labeled "A" through "E", with group A being closest to the host-vehicle 12 and group E being the furthest from the host-vehicle 12. Some of the groups represent real-objects 38 and others represent phantom-objects 40, as will be described below.

Figure 4A:
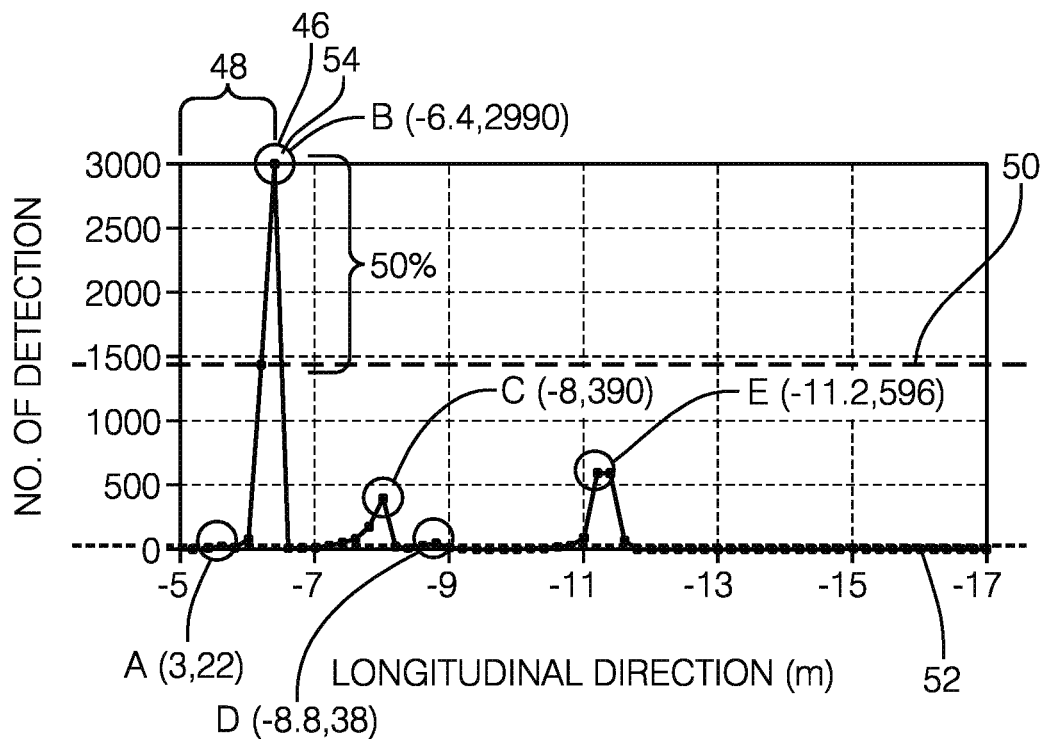
FIG. 4A is a plot of the objects in FIG. 3B in accordance with one embodiment.
Figure 4B:
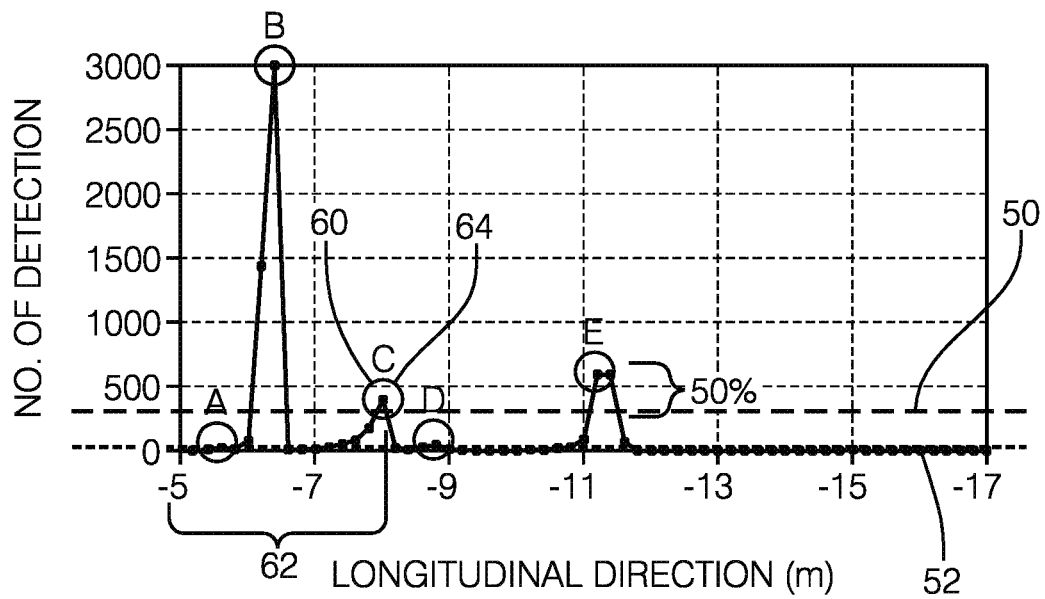
FIG. 4B is a plot of the objects in FIG. 3B in accordance with one embodiment.

FIGS. 4A-4B illustrate the plot of FIG. 3B with limits applied to filter out the phantom-objects 40. FIG. 4A also includes the X-Y coordinates of the peaks of each group. The controller-circuit 32 determines a trailer-distance 42 between the host-vehicle 12 and a front 44 of the cargo-trailer 14A based on the distance 28 to a first-group 46 of objects 26 detected by the ranging-sensor 20. That is, the controller-circuit 32 determines the distance 28 between a rear-end of the host-vehicle 12 and the front 44 of the cargo-trailer 14A based on a first major group of ZRR targets closest in proximity to the host-vehicle 12. The first-group 46 is characterized by a first-distance 48 indicated by the ranging-sensor 20. In order to distinguish the real-objects 38 from the phantom-objects 40 the controller-circuit 32 further determines a peak-threshold 50 that represents detections of real-objects 38 detected by the ranging-sensor 20, and a noise-threshold 52 that represents detections of phantom-objects 40 detected by the ranging-sensor 20, with the peak-threshold 50 being greater than the noise-threshold 52. The peak-threshold 50 and the noise-threshold 52 may be defined by the user and in the example illustrated in FIG. 4A the peak-threshold 50 is set to 50% of the largest group (i.e. group B) which is indicated by a dashed line at 1495-detections. The noise-threshold 52 is set to zero detections. The first-group 46 of objects 26 is determined by a first-detection-count 54 that is closer in magnitude to the peak-threshold 50 than to the noise-threshold 52, and is first closest in proximity to the host-vehicle 12. Each of the groups A through E are compared to both the peak-threshold 50 and to the noise-threshold 52 and a determination is made by the controller-circuit 32 whether each group is closer in magnitude to the peak-threshold 50 or closer to the noise-threshold 52. The groups that are closest to the noise-threshold 52 (i.e. groups A, C, D and E in FIG. 4A) are excluded from the determination of the first-group 46, leaving only group B. Thus, group B is classified as the first-group 46 and the first-distance 48 is determined to be 1.4 m from the rear-end of the host-vehicle 12.

The controller-circuit 32 further determines an axle-distance 56 between the front 44 of the cargo-trailer 14A and a trailer-axle 58 based on a second-group 60 of objects 26 detected by the ranging-sensor 20, as illustrated in FIG. 4B. That is, the controller-circuit 32 determines the distance 28 between the rear-end of the host-vehicle 12 and the trailer-axle 58 of the cargo-trailer 14A based on a second major group of ZRR targets behind the host-vehicle 12 that are farther from the host-vehicle 12 relative to the first-group 46. The second-group 60 is characterized by a second-distance 62 indicated by the ranging-sensor 20. The controller-circuit 32 sets the peak-threshold 50 to 50% of the largest group (i.e. group E) which is shown by the dashed line at 298-detections, and the noise-threshold 52 is set to zero detections. The second-group 60 of objects 26 is determined by a second-detection-count 64 that is closer in magnitude to the peak-threshold 50 than to the noise-threshold 52, and is second closest in proximity to the host-vehicle 12. Each of the groups C, D, and E are compared to both the peak-threshold 50 and to the noise-threshold 52 and a determination is made by the controller-circuit 32 whether each group is closer in magnitude to the peak-threshold 50 or closer to the noise-threshold 52. The groups that are closest to the noise-threshold 52 (i.e. group D in FIG. 4B) are excluded from the determination of the second-group 60, leaving only groups C and E. Thus, group C is classified as the second-group 60 because group C is second closest to the host-vehicle 12, and the second-distance 62 is determined to be 3 m from the rear-end of the host-vehicle 12. The controller-circuit 32 subtracts the first-distance 48 from the second-distance 62 to obtain the axle-distance 56, which is 1.6 m in the example illustrated in FIG. 4B.

The controller-circuit 32 further determines the trailer-length 16 based on the trailer-distance 42 and the axle-distance 56. The trailer-length 16 (TL) is determined by a formula including the trailer-distance 42 (Lo), the axle-distance 56 (L1), and a constant 66 (C) using the following formula:

$$TL = Lo + L1 + L1*C$$

The constant 66, C, is in a range from 0.6 to 0.75, and was determined by the inventors based on known trailer-specifications and empirical data. Experimentation by the inventors has discovered that the constant 66, equal to 0.7 provides adequate estimation of the trailer-length 16 for a majority of the cargo-trailers 14A tested. Inserting the trailer-distance 42 and the axle-distance 56 into the above equation yields a trailer-length 16 estimation of:

$$TL = 1.4\ m + 1.6\ m + (1.6\ m * 0.7) = 4.12\ m$$

The known-length of the cargo-trailer 14A in the example illustrated in FIG. 4B is 3.9 m and indicates an error of 0.22 m. The error may be reduced by increasing the resolution (i.e. reducing the spacing) of the longitudinal groups along the host-vehicle-longitudinal-axis 34, which are 0.2 m in the above example. Experimentation by the inventors has discovered that the 0.2 m spacing provides an adequate balance of memory utilization requirements and measurement error.

Figure 5A:
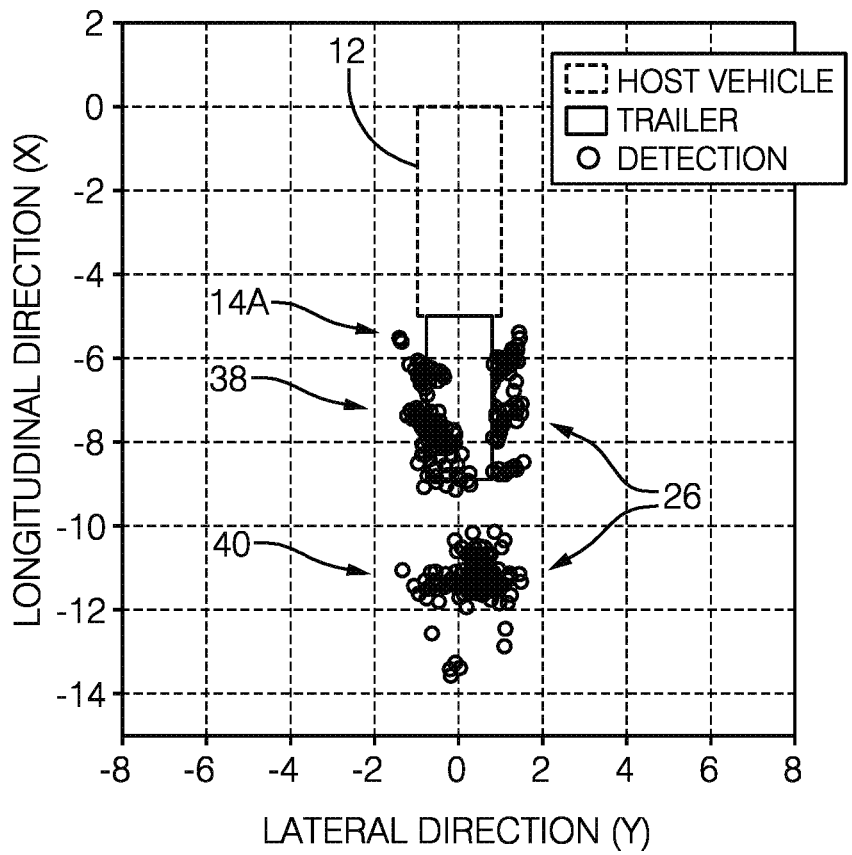
FIG. 5A is a plot of objects detected by the detection system of FIG. 1 in accordance with one embodiment.
Figure 5B:
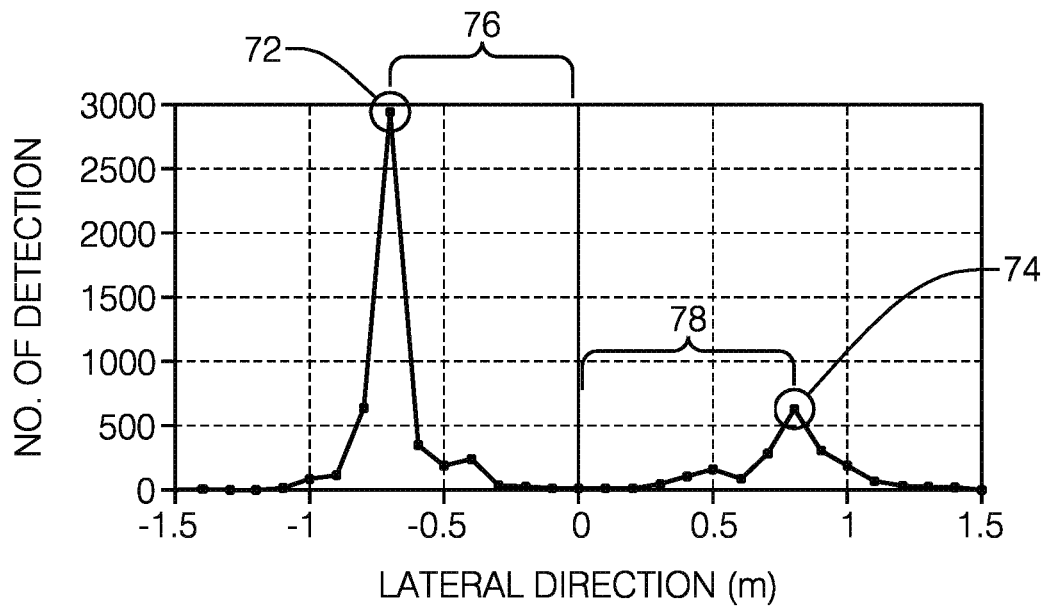
FIG. 5B is a plot of the objects of FIG. 5A in a lateral direction in accordance with one embodiment.

FIG. 5B illustrates a plot of the groups of the ZRR targets from FIG. 5A along the host-vehicle-lateral-axis 36 transverse to the host-vehicle-longitudinal-axis 34. The groups represent the ZRR targets detected in increments of 0.1 m extending from a centerline 68 of the host-vehicle 12 in a lateral direction. For example, every 10 points along the x-axis of the plot in FIG. 5B represents 1.0 m of distance 28 from the centerline 68 of the host-vehicle 12. The centerline 68 is indicated by zero on the Y-axis of FIGS. 5A-5B and is parallel with the host-vehicle-longitudinal-axis 34. The Y-axis in FIG. 5B represents the number of detections in a group.

The controller-circuit 32 further determines the trailer-width 18 of the trailer 14 by the distance 28 between a third-group 72 and a fourth-group 74 of objects 26 detected by the ranging-sensor 20. The third-group 72 is characterized by a first-lateral-offset 76 relative to the centerline 68 of the host-vehicle 12 as indicated by the ranging-sensor 20, and the fourth-group 74 is characterized by a second-lateral-offset 78 relative to the centerline 68 of the host-vehicle 12 as indicated by the ranging-sensor 20. The third-group 72 and the fourth-group 74 are identified by the controller-circuit 32 as the groups having the greatest number of ZRR detections on a left-side and a right-side of the centerline 68, and no filtering of the phantom-objects 40 is required. In the example illustrated in FIG. 5B, the estimated trailer-width 18 is 1.5 m compared to the known-width of 1.52 m, and indicates an error of 0.02 m. The error may be reduced by increasing the resolution (i.e. reducing the spacing) of the lateral groups, which are 0.1 m in the above example. Experimentation by the inventors has discovered that the 0.1 m spacing provides an adequate balance of memory utilization requirements and measurement error.

The system 10 may exclude any detections that are beyond a typical maximum trailer-dimension of 2.44 m×15.24 m.

Figure 6:
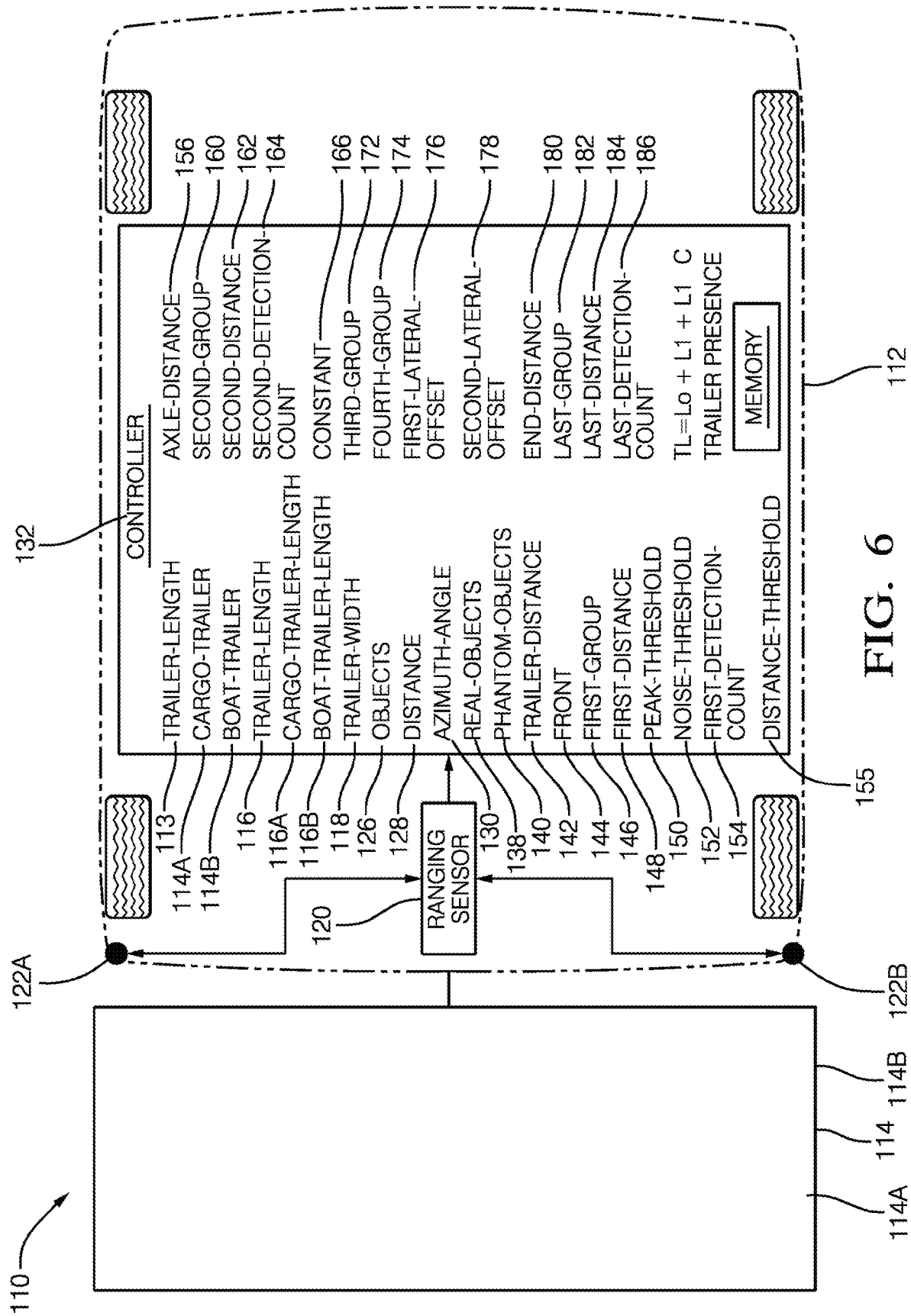
FIG. 6 is an illustration of a detection system in accordance with another embodiment.

FIG. 6 illustrates another embodiment of a detection system 110, hereafter referred to as the system 110, installed on a host-vehicle 112 towing a trailer 114. As will be described in more detail below, the system 110 is an improvement over other detection systems because the system 110 determines a trailer-type 113, a trailer-length 116 and a trailer-width 118 based on detected targets by filtering out erroneous detections. The trailer 114 may be a cargo-trailer 114A that may be an enclosed-type with solid panels, or may be an open-type with an exposed frame. The trailer 114 may also be a boat-trailer 114B. The boat-trailer 114B may, or may not, be carrying a boat, and may present a unique ranging-sensor-signal or signal-pattern compared to the cargo-trailer 114A that may further assist in a determination of the type of trailer 114 being towed by the host-vehicle 112.

The system 110 includes a ranging-sensor 120. The ranging-sensor 120 may be a radar-sensor 122 or a lidar-sensor 124 as will be understood by those in the art. The ranging-sensor 120 is configured to detect objects 126 proximate to the host-vehicle 112. In the example illustrated in FIG. 6, the ranging-sensor 120 is the radar-sensor 122. The radar-sensor 122 detects a radar-signal (not specifically shown) that is reflected by features of the trailer 114 towed by the host-vehicle 112. Typically, radar-systems on vehicles are capable of only determining a distance 128 (i.e. range) and azimuth-angle 130 to the target so may be referred to as a two-dimensional (2D) radar-system. Other radar-systems are capable of determining an elevation-angle to the target so may be referred to as a three-dimensional (3D) radar-system. In the non-limiting example illustrated in FIG. 6, the 2D radar-sensor 122 includes a left-sensor 122A and a right-sensor 122B. It is contemplated that the teachings presented herein are applicable to both 2D radar-systems and 3-D radar-systems with one or more sensor devices, i.e. multiple instances of the radar-sensor 122. The radar-sensor 122 is generally configured to detect the radar-signal that may include data indicative of the detected-target present on the trailer 114. As used herein, the detected-target present on the trailer 114 may be a feature of the trailer 114 that is detected by the radar-sensor 122 and tracked by a controller-circuit 132, as will be described below.

Figure 7:
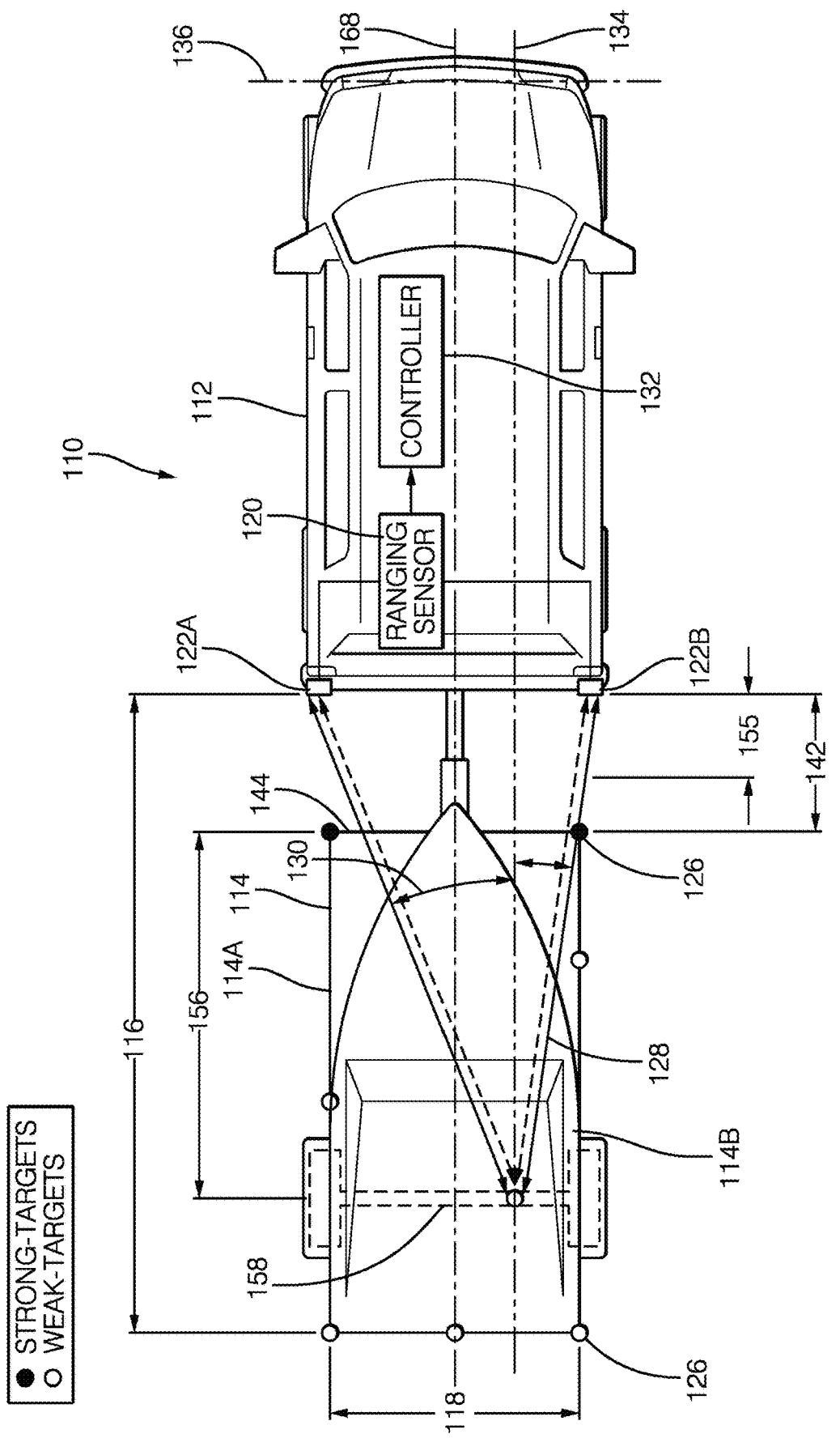
FIG. 7 is an illustration of the detection system of FIG. 6 in accordance with another embodiment.

FIG. 7 illustrates some of the various types of targets located on the trailer 114 detected by the radar-sensor 122. By way of example and not limitation, the radar-sensor 122 may be configured to output a continuous or periodic data stream that includes a variety of signal characteristics associated with each target detected. The signal characteristics may include or be indicative of, but are not limited to, the range to the detected-target from the host-vehicle 112, the azimuth-angle 130 to the detected-target relative to a host-vehicle-longitudinal-axis 134, an amplitude (not shown) of the radar-signal, and a relative-velocity (not shown) of closure relative to the detected-target. A target is generally detected because the radar-signal from the detected-target has sufficient signal strength to meet some predetermined threshold. That is, there may be targets that reflect the radar-signal, but the strength of the radar-signal is insufficient to be characterized as one of the detected-targets. Data that corresponds to a strong-target will generally be from consistent, non-intermittent signals. However, data that corresponds to a weak-target may be intermittent or have some substantial variability due to a low signal-to-noise ratio.

The system 110 also includes the controller-circuit 132 in communication with the ranging-sensor 120. The ranging-sensor 120 may be hardwired to the controller-circuit 132 through the host-vehicle's 112 electrical-system (not shown), or may communicate through a wireless network (not shown). The controller-circuit 132 may include a processor (not shown) such as a microprocessor or other control circuitry such as analog and/or digital control circuitry including an application specific integrated circuit (ASIC) for processing data as should be evident to those in the art. The controller-circuit 132 may include a memory (not specifically shown), including non-volatile memory, such as electrically erasable programmable read-only memory (EEPROM) for storing one or more routines, thresholds, and captured data. The one or more routines may be executed by the processor to perform steps for detecting the objects 126 based on signals received by the controller-circuit 132 from the ranging-sensor 120 as described herein. The controller-circuit 132 is configured to determine that the trailer 114 is being towed by the host-vehicle 112 (i.e. determine a trailer-presence) using the known methods of zero-range-rate (ZRR) detection of targets that will be understood by those in the art.

Figure 8A:
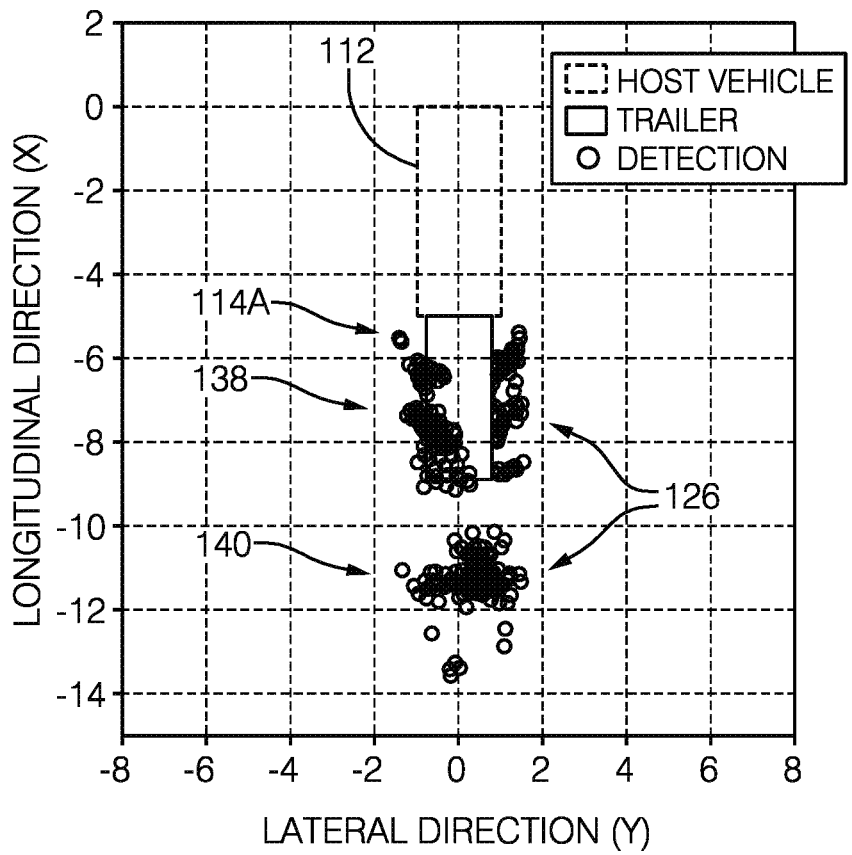
FIG. 8A is a plot of objects detected by the detection system of FIG. 6 in accordance with another embodiment.

FIG. 8A illustrates a plot of multiple radar-sensor 122 data acquisition cycles that locate the ZRR targets along the host-vehicle-longitudinal-axis 134 and a host-vehicle-lateral-axis 136. Each data acquisition cycle consists of 64-detections per radar-sensor 122 within a time interval of 50-milliseconds (50 ms), or a total of 128-detections for the two radar-sensors 122A and 122B. The data may be filtered to reduce noise by any of the known filtering methods, and in FIG. 8A has been filtered to 64-detections for the two radar-sensors 122A and 122B. The origin of the plot is located at a center of the host-vehicle's 112 front-bumper.

Figure 8B:
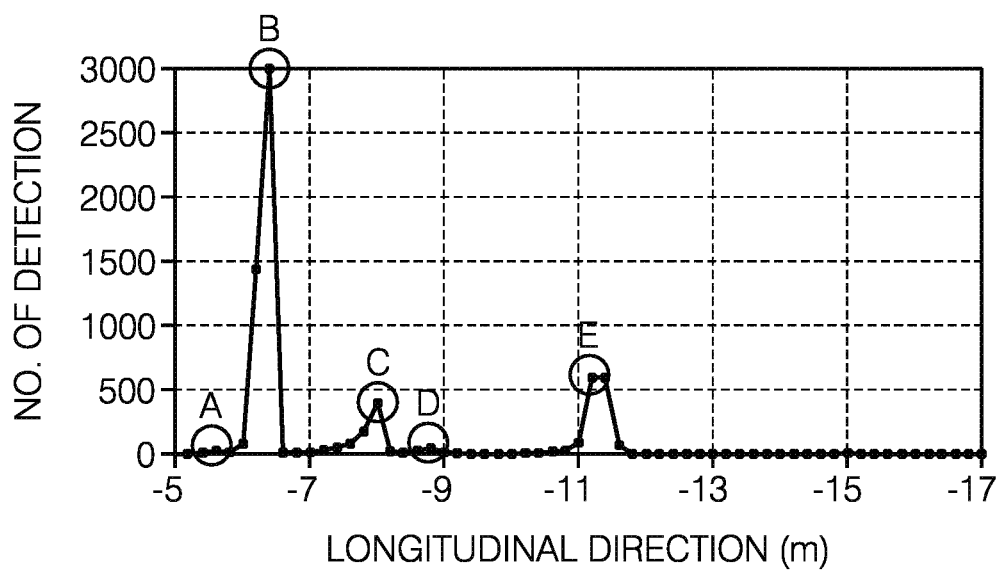
FIG. 8B is a plot of the objects of FIG. 8A in a longitudinal direction in accordance with another embodiment.

FIG. 8B illustrates a plot of the groups of the ZRR targets from FIG. 8A along the host-vehicle-longitudinal-axis 134 only. The groups represent the ZRR targets detected in increments of 0.2 meters (0.2 m) extending from a rear-end of the host-vehicle 112. For example, every 10 points along the x-axis of the plot in FIG. 8B represents 2.0 m of distance 128 from the rear-end of the 5 m long host-vehicle 112. The Y-axis in FIG. 8B represents the number of detections in a group. A total of 5 separate groups of detections are indicated by peaks in the plot and are labeled "A" through "E", with group A being closest to the host-vehicle 112 and group E being the furthest from the host-vehicle 112. Some of the groups represent real-objects 138 and others represent phantom-objects 140, as will be described below.

Figure 9A:
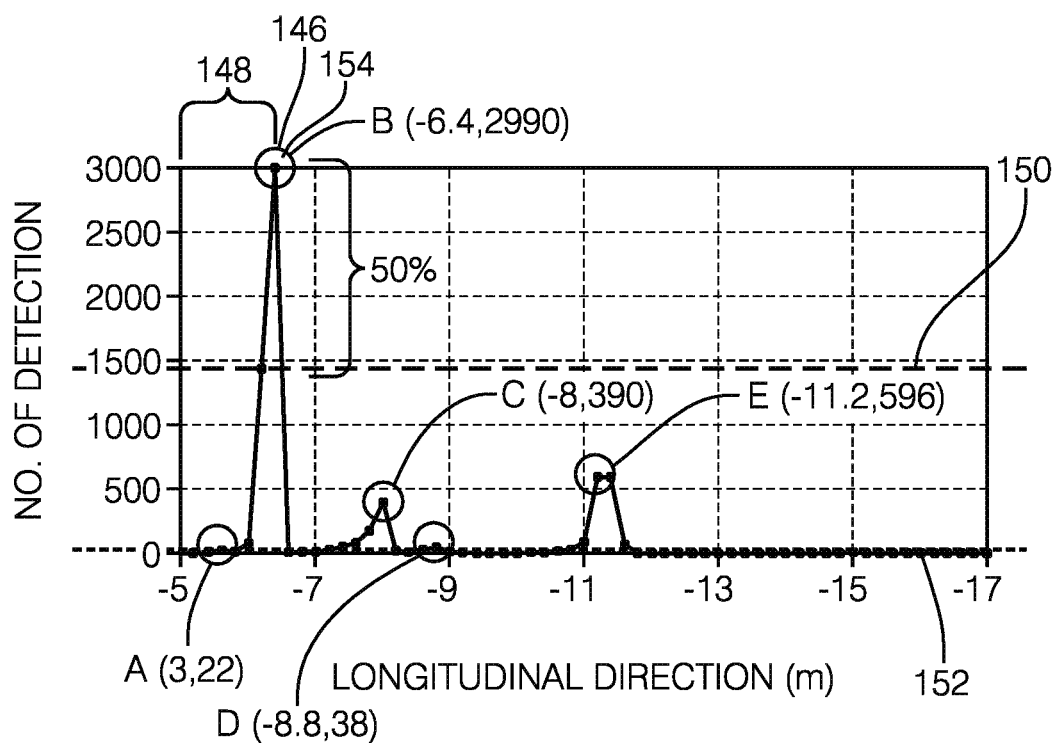
FIG. 9A is a plot of the objects in FIG. 8B in accordance with another embodiment.
Figure 9B:
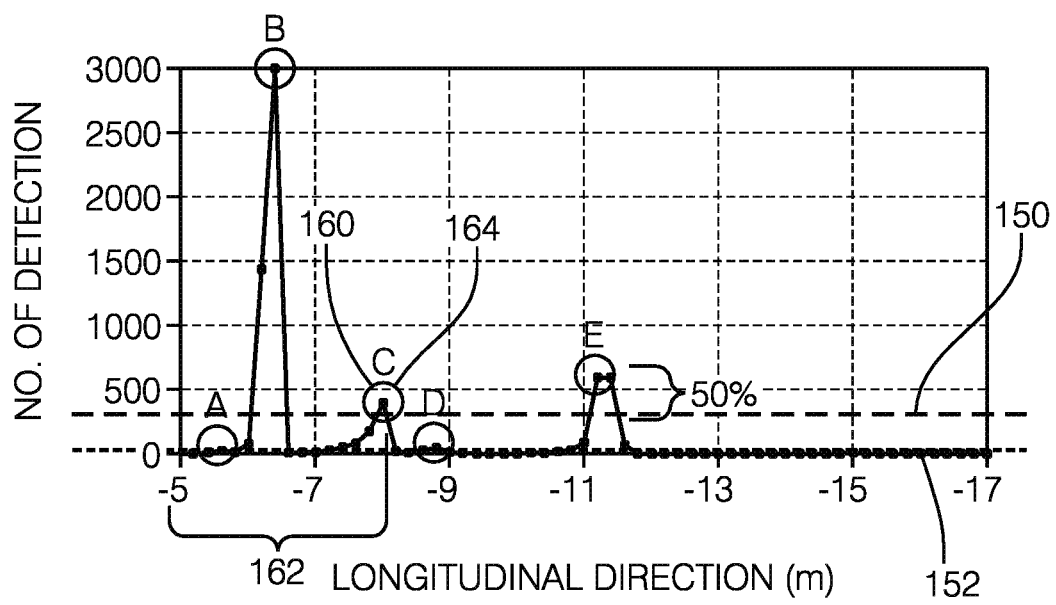
FIG. 9B is a plot of the objects in FIG. 8B in accordance with another embodiment.

FIGS. 9A-9B illustrate the plot of FIG. 8B with limits applied to filter out the phantom-objects 140. FIG. 9A also includes the X-Y coordinates of the peaks of each group. The controller-circuit 132 determines a trailer-distance 142 between the host-vehicle 112 and a front 144 of the trailer 114 based on the distance 128 to a first-group 146 of objects 126 detected by the ranging-sensor 120. That is, the controller-circuit 132 determines the distance 128 between a rear-end of the host-vehicle 112 and the front 144 of the trailer 114 based on a first major group of ZRR targets closest to the host-vehicle 112. The first-group 146 is characterized by a first-distance 148 indicated by the ranging-sensor 120. In order to distinguish the real-objects 138 from the phantom-objects 140 the controller-circuit 132 further determines a peak-threshold 150 that represents detections of real-objects 138 detected by the ranging-sensor 120, and a noise-threshold 152 that represents detections of phantom-objects 140 detected by the ranging-sensor 120, with the peak-threshold 150 being greater than the noise-threshold 152. The peak-threshold 50 and the noise-threshold 52 may be defined by the user and in the example illustrated in FIG. 9A, the peak-threshold 150 is set to 50% of the largest group (i.e. group B) which is indicated by a dashed line at 1495-detections, and the noise-threshold 152 is set to zero-detections. The first-group 146 of objects 126 is determined by a first-detection-count 154 that is closer in magnitude to the peak-threshold 150 than to the noise-threshold 152, and is first closest in proximity to the host-vehicle 112. Each of the groups A through E are compared to both the peak-threshold 150 and to the noise-threshold 152 and a determination is made by the controller-circuit 132 whether each group is closer in magnitude to the peak-threshold 150 or to the noise-threshold 152. The groups that are closest to the noise-threshold 152 (i.e. groups A, C, D and E in FIG. 9A) are excluded from the determination of the first-group 146, leaving only group B. Thus, group B is classified as the first-group 146 and the first-distance 148 is determined to be 1.4 m from the rear-end of the host-vehicle 12.

The controller-circuit 132 determines the trailer-type 113 being towed by the host-vehicle 112 based on a comparison of the trailer-distance 142 to a distance-threshold 155. The trailer-type 113 is characterized as a cargo-trailer 114A in accordance with a determination that the trailer-distance 142 is less than the distance-threshold 155 that is in a range of 2 m to 3 m. The trailer-type 113 is characterized as the boat-trailer 114B in accordance with the determination that the trailer-distance 142 is greater than the distance-threshold 155. Experimentation by the inventors has discovered that the distance-threshold 155 of 3 m provides adequate results in distinguishing between the cargo-trailer 114A and the boat-trailer 114B.

In accordance with the determination that the trailer-type 113 is characterized as the cargo-trailer 114A, the controller-circuit 132 further determines an axle-distance 156 between the front 144 of the trailer 114 and a trailer-axle 158 based on a second-group 160 of objects 126 detected by the ranging-sensor 120, as illustrated in FIG. 9B. That is, the controller-circuit 132 determines the distance 128 between the rear-end of the host-vehicle 112 and the trailer-axle 158 of the cargo-trailer 114A based on a second major group of ZRR targets behind the host-vehicle 112 that are farther from the host-vehicle 112 relative to the first-group 146. The second-group 160 is characterized by a second-distance 162 indicated by the ranging-sensor 120. The controller-circuit 132 sets the peak-threshold 150 to 50% of the largest group (i.e. group E) which is indicated by the dashed line at 298-detections, and the noise-threshold 152 is set to zero-detections. The second-group 160 of objects 126 is determined by a second-detection-count 164 that is closer in magnitude to the peak-threshold 150 than to the noise-threshold 152, and is second closest in proximity to the host-vehicle 112. Each of the groups C, D, and E are compared to both the peak-threshold 150 and to the noise-threshold 152 and a determination is made by the controller-circuit 132 whether each group is closer in magnitude to the peak-threshold 150 or closer to the noise-threshold 152. The groups that are closest to the noise-threshold 152 (i.e. group D in FIG. 9B) are excluded from the determination of the second-group 160, leaving only groups C and E. Thus, group C is classified as the second-group 160 because group C is second closest to the host-vehicle 112, and the second-distance 162 is determined to be 3 m from the rear-end of the host-vehicle 112. The controller-circuit 132 subtracts the first-distance 148 from the second-distance 162 to obtain the axle-distance 156, which is 1.6 m in the example illustrated in FIG. 9B.

The controller-circuit 132 further determines a cargo-trailer-length 116A of the cargo-trailer 114A based on the trailer-distance 142 and the axle-distance 156. The cargo-trailer-length 116A (TL) is determined by a formula including the trailer-distance 142 (Lo), the axle-distance 156 (L1), and a constant 166 (C) using the following formula:

$$TL = Lo + L1 + L1 * C$$

The constant 166, C, is in a range from 0.6 to 0.75, and was determined by the inventors based on known trailer 114 specifications and empirical data. Experimentation by the inventors has discovered that the constant 166, equal to 0.7 provides adequate estimation of the cargo-trailer-length 116A for a majority of cargo-trailers 114A tested. Inserting the trailer-distance 142 and the axle-distance 156 into the above equation yields the cargo-trailer-length 116A estimation of:

$$TL = 1.4 \text{ m} + 1.6 \text{ m} + (1.6 \text{ m} * 0.7) = 4.12 \text{ m}$$

The known-length of the cargo-trailer 114A in the example illustrated in FIG. 9B is 3.9 m and indicates an error of 0.22 m. The error may be reduced by increasing the resolution (i.e. reducing the spacing) of the longitudinal groups along the host-vehicle-longitudinal-axis 134, which are 0.2 m in the above example. Experimentation by the inventors has discovered that the 0.2 m spacing provides an adequate balance of memory utilization requirements and measurement error.

Figure 10A:
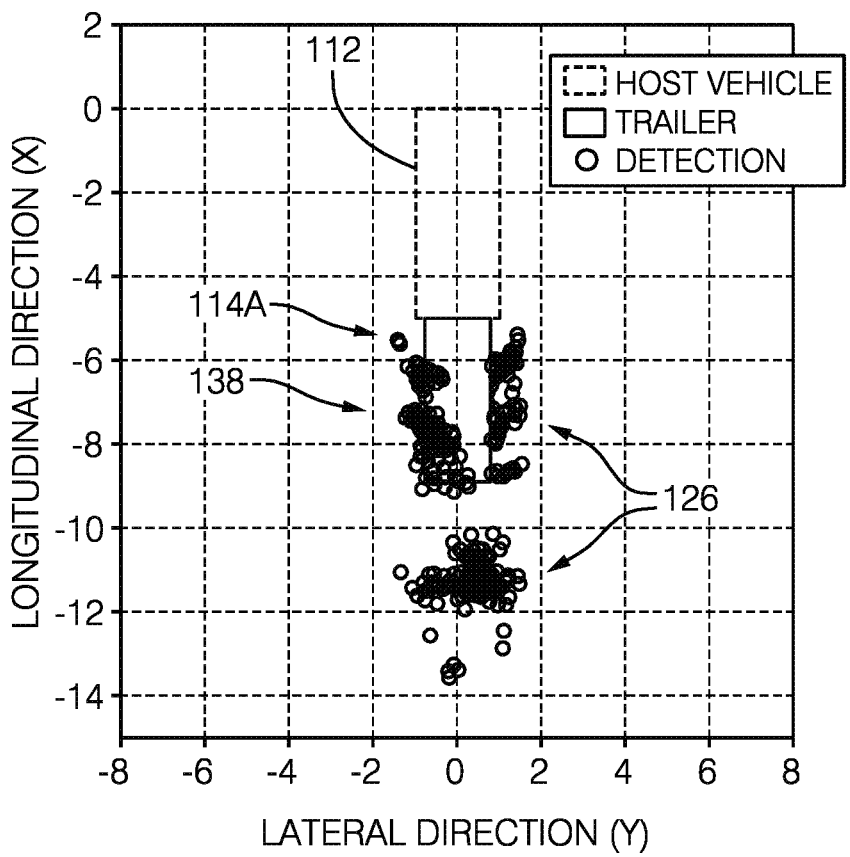
FIG. 10A is a plot of objects detected by the detection system of FIG. 6 in accordance with another embodiment.
Figure 10B:
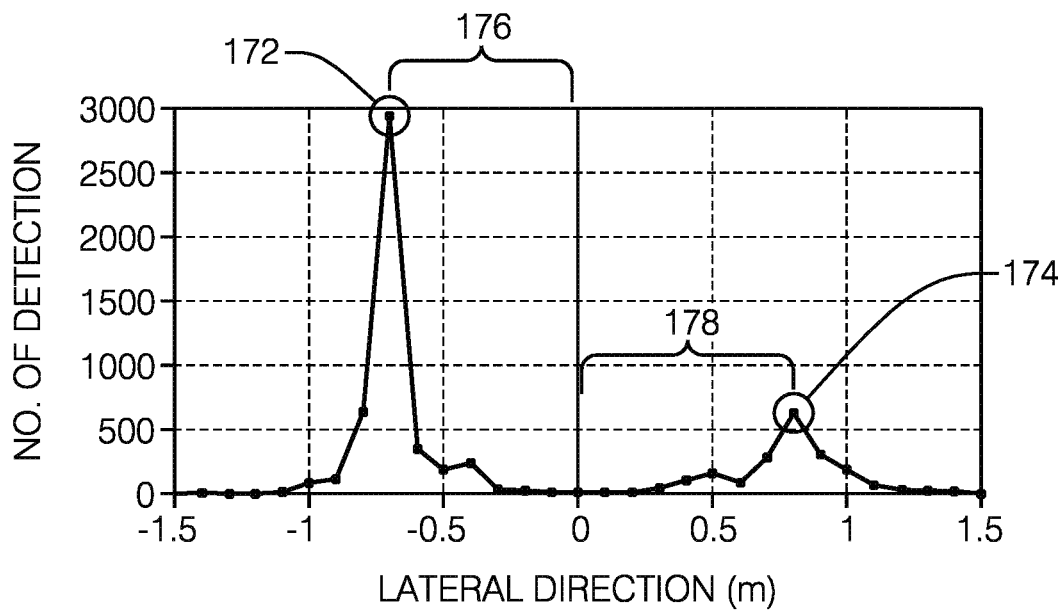
FIG. 10B is a plot of the objects of FIG. 10A in a lateral direction in accordance with another embodiment.

FIG. 10B illustrates a plot of the groups of the ZRR targets from FIG. 10A along the host-vehicle-lateral-axis 136 transverse to the host-vehicle-longitudinal-axis 134. The groups represent the ZRR targets detected in increments of 0.1 m extending from a centerline 168 of the host-vehicle 112 in a lateral direction. For example, every 10-points along the x-axis of the plot in FIG. 10B represents 1.0 m of distance 128 from the centerline 168 host-vehicle 112. The centerline 168 is indicated by zero on the Y-axis of FIGS. 10A-10B and is parallel with the host-vehicle-longitudinal-axis 134. The Y-axis in FIG. 10B represents the number of detections in a group.

The controller-circuit 132 further determines a trailer-width 118 of the cargo-trailer 114A by the distance 128 between a third-group 172 and a fourth-group 174 of objects 126 detected by the ranging-sensor 120. The third-group 172 is characterized by a first-lateral-offset 176 relative to the centerline 168 of the host-vehicle 112 as indicated by the ranging-sensor 120 and the fourth-group 174 is characterized by a second-lateral-offset 178 relative to the centerline 168 of the host-vehicle 112 as indicated by the ranging-sensor 120. The third-group 172 and the fourth-group 174 are identified by the controller-circuit 132 as the groups having the greatest number of detections on a left-side and a right-side of the centerline 168, and no filtering of phantom-objects 140 is required. In the example illustrated in FIG. 10B, the estimated trailer-width 118 is 1.5 m compared to the known-width of 1.52 m, and indicates an error of 0.02 m. The error may be reduced by increasing the resolution (i.e. reducing the spacing) of the lateral groups, which are 0.1 m in the above example. Experimentation by the inventors has discovered that the 0.1 m spacing provides an adequate balance of memory utilization requirements and measurement error.

Figure 11A:
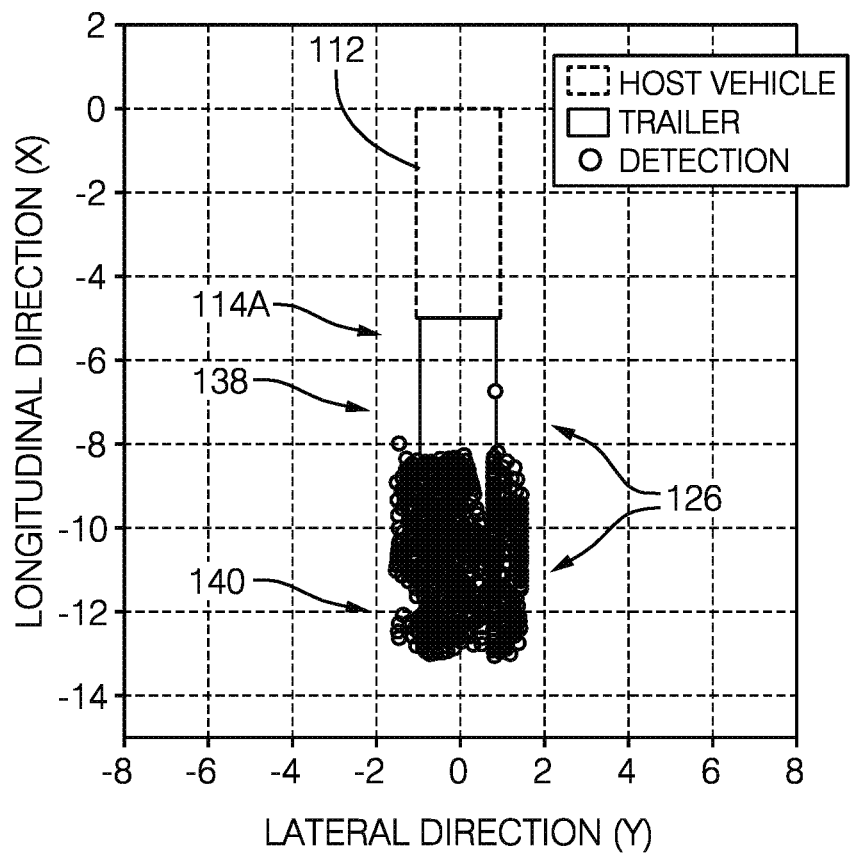
FIG. 11A is a plot of objects detected by the detection system of FIG. 6 in accordance with another embodiment.
Figure 11B:
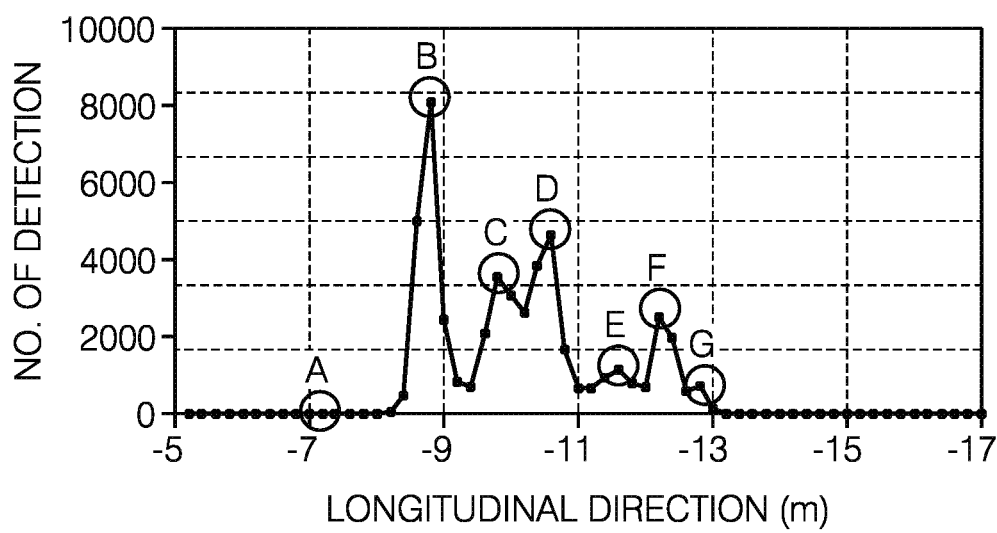
FIG. 11B is a plot of the objects of FIG. 11A in a longitudinal direction in accordance with another embodiment.

FIG. 11A illustrates a plot of multiple radar-sensor 122 data acquisition cycles for the boat-trailer 114B that locate the ZRR targets along the host-vehicle-longitudinal-axis 134 and the host-vehicle-lateral-axis 136. FIG. 11B illustrates a plot of the groups of the ZRR targets from FIG. 11A along the host-vehicle-longitudinal-axis 134 only. In accordance with the determination that the trailer-type 113 is characterized as the boat-trailer 114B the controller-circuit 132 further determines an end-distance 180 to an end of the boat-trailer 114B based on a last-group 182 of objects 126 detected by the ranging-sensor 120. The last-group 182 is characterized by a last-distance 184 indicated by the ranging-sensor 120 and the controller-circuit 132 determines a boat-trailer-length 116B based on the end-distance 180.

Figure 12A:
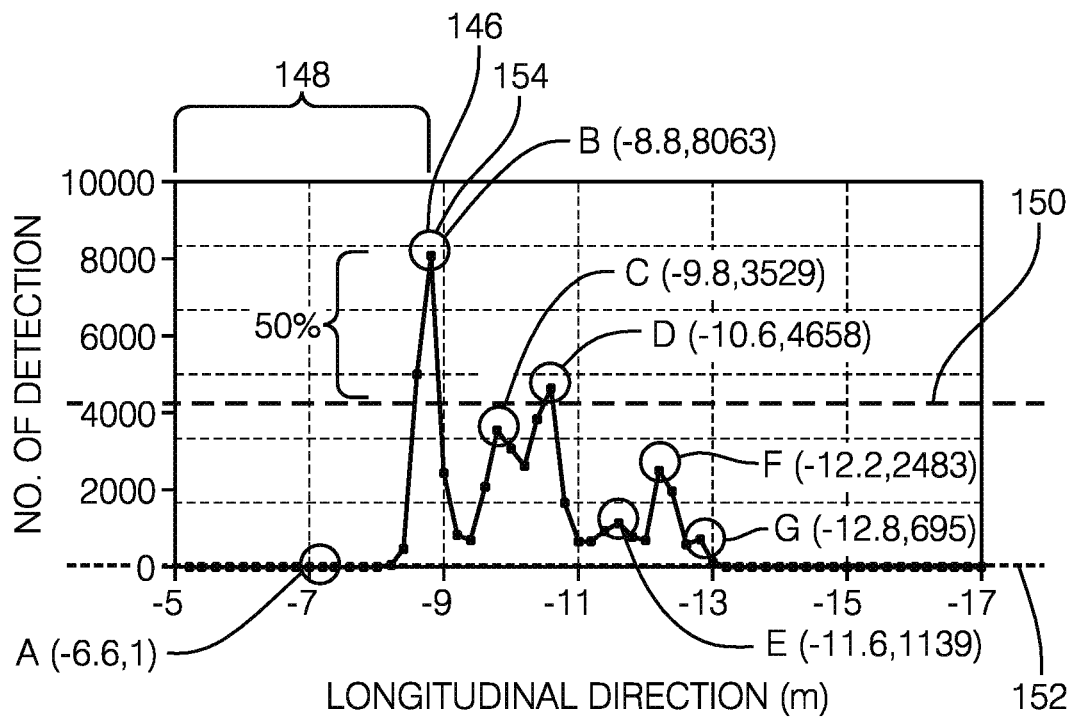
FIG. 12A is a plot of the objects in FIG. 11B in accordance with another embodiment.
Figure 12B:
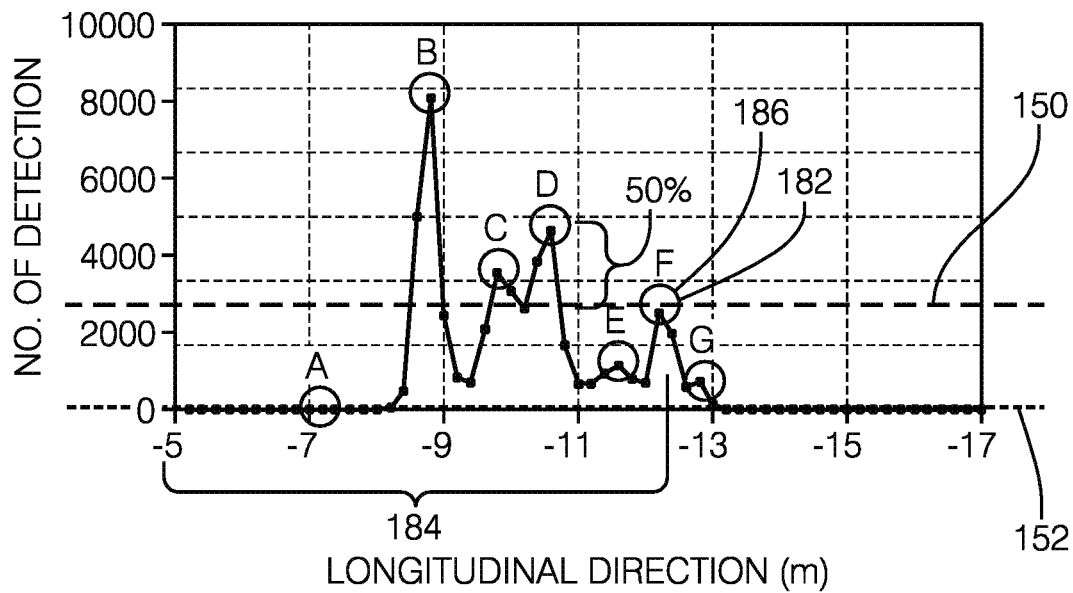
FIG. 12B is a plot of the objects in FIG. 11B in accordance with another embodiment.

FIGS. 12A-12B illustrate the plot of FIG. 11B with limits applied to filter out the phantom-objects 140 just as described for the cargo-trailer 114A above. FIG. 12A also includes the X-Y coordinates of the peaks of each group. The controller-circuit 132 determines the trailer-distance 142 between the host-vehicle 112 and the front 144 of the boat-trailer 114B based on the distance 128 to the first-group 146 of objects 126 detected by the ranging-sensor 120. That is, the controller-circuit 132 determines the distance 128 between a rear-end of the host-vehicle 112 and the front 144 of the boat-trailer 114B based on the first major group of ZRR targets closest to the host-vehicle 112. The first-group 146 is characterized by the first-distance 148 indicated by the ranging-sensor 120. In order to distinguish the real-objects 138 from the phantom-objects 140 the controller-circuit 132 further determines the peak-threshold 150 that represents detections of real-objects 138 detected by the ranging-sensor 120, and the noise-threshold 152 that represents detections of phantom-objects 140 detected by the ranging-sensor 120, with the peak-threshold 150 being greater than the noise-threshold 152. In the example illustrated in FIG. 12A, the peak-threshold 150 is set to 50% of the largest group (i.e. group B) which is indicated by a dashed line at 4031-detections, and the noise-threshold 152 is set to zero-detections. The first-group 146 of objects 126 is determined by the first-detection-count 154 that is closer in magnitude to the peak-threshold 150 than to the noise-threshold 152, and is first closest in proximity to the host-vehicle 112. Each of the groups A through G are compared to both the peak-threshold 150 and to the noise-threshold 152 and the determination is made by the controller-circuit 132 whether each group is closer in magnitude to the peak-threshold 150 or to the noise-threshold 152. The groups that are closest to the noise-threshold 152 (i.e. groups A, E and G in FIG. 12A) are excluded from the determination of the first-group 146, leaving groups B, C, D and F. Thus, group B is classified as the first-group 146 and the first-distance 148 is determined to be 3.8 m from the rear-end of the host-vehicle 12, which is located greater than the distance-threshold 155 of 3 m behind the host-vehicle 112 and determined to be the boat-trailer 114B.

In accordance with the determination that the trailer-type 113 is characterized as the boat-trailer 114B, the controller-circuit 32 further determines the last-group 182 of objects 126 (group-F) determined by a last-detection-count 186 that is closer in magnitude to the peak-threshold 150 than to the noise-threshold 152 and is farthest in proximity to the host-vehicle 112, as illustrated in FIG. 12B. The controller-circuit 132 sets the peak-threshold 150 to 50% of the largest group (i.e. group D) which is indicated by the dashed line at 2329-detections, and the noise-threshold 152 is set to zero-detections. The last-group 182 of objects 126 is determined by the last-detection-count 186 that is closer in magnitude to the peak-threshold 150 than to the noise-threshold 152, and is farthest in proximity to the host-vehicle 112. Each of the groups C, through G are compared to both the peak-threshold 150 and to the noise-threshold 152 and a determination is made by the controller-circuit 132 whether each group is closer in magnitude to the peak-threshold 150 or closer to the noise-threshold 152. The groups that are closest to the noise-threshold 152 (i.e. groups E and G in FIG. 12B) are excluded from the determination of the second-group 160, leaving only groups C, D and F. Thus, group F is classified as the last-group 182 because group F is farthest from the host-vehicle 112, and the last-distance 184 is determined to be 7.2 m from the rear-end of the host-vehicle 112. The boat-trailer-length 116B is estimated to be 7.2 m compared to the known-length of 7.2 m and indicates an error of 0.0 m.

Figure 13A:
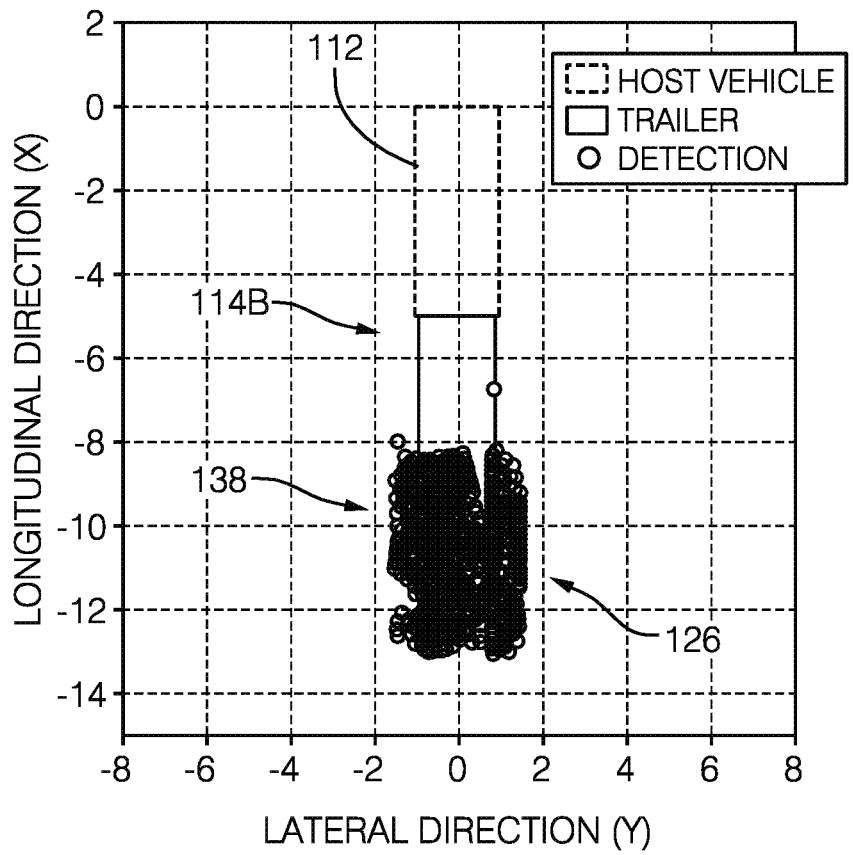
FIG. 13A is a plot of objects detected by the detection system of FIG. 6 in accordance with another embodiment.
Figure 13B:
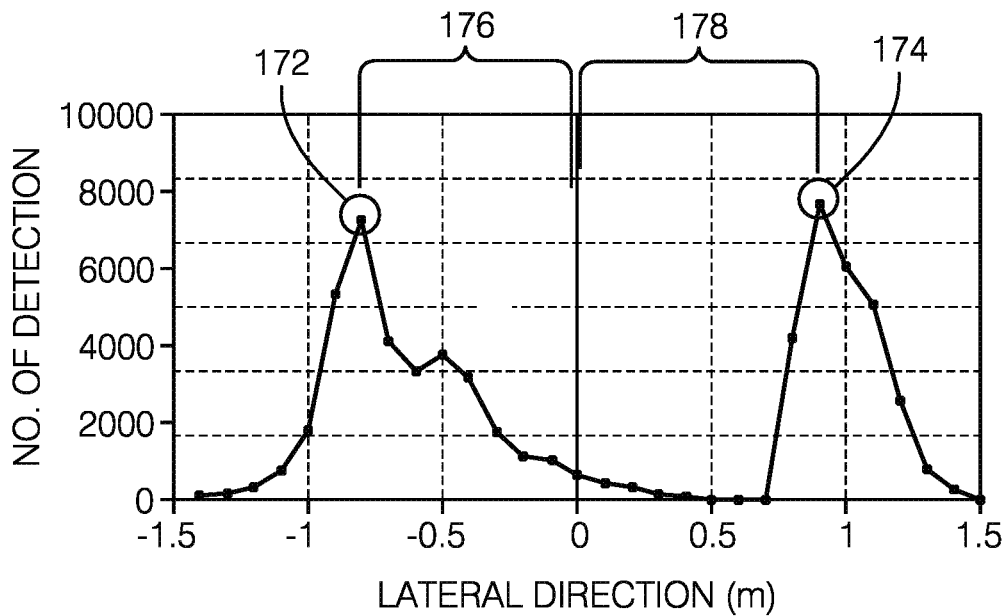
FIG. 13B is a plot of the objects of FIG. 13A in a lateral direction in accordance with another embodiment.

FIG. 13B illustrates a plot of the groups of the ZRR targets from FIG. 13A along the host-vehicle-lateral-axis 136 transverse to the host-vehicle-longitudinal-axis 134. The groups represent the ZRR targets detected in increments of 0.1 m extending from the centerline 168 of the host-vehicle 112 in the lateral direction. For example, every 10-points along the x-axis of the plot in FIG. 13B represents 1.0 m of distance 128 from the centerline 168 host-vehicle 112. The centerline 168 is indicated by zero on the Y-axis of FIGS. 13A-13B and is parallel with the host-vehicle-longitudinal-axis 134. The Y-axis in FIG. 13B represents the number of detections in a group.

The controller-circuit 132 further determines the trailer-width 118 of the boat-trailer 114B by the distance 128 between the third-group 172 and the fourth-group 174 of objects 126 detected by the ranging-sensor 120. The third-group 172 is characterized by the first-lateral-offset 176 relative to the centerline 168 of the host-vehicle 112 as indicated by the ranging-sensor 120, and the fourth-group 174 is characterized by the second-lateral-offset 178 relative to the centerline 168 of the host-vehicle 112 as indicated by the ranging-sensor 120. The third-group 172 and the fourth-group 174 are identified by the controller-circuit 132 as the groups having the greatest number of detections on the left-side and the right-side of the centerline 168, and no filtering of phantom-objects 140 is required. In the example illustrated in FIG. 13B, the estimated trailer-width 118 is 1.7 m compared to the known-width of 1.9 m, and indicates an error of 0.2 m. The error may be reduced by increasing the resolution (i.e. reducing the spacing) of the lateral groups, which are 0.1 m in the above example. Experimentation by the inventors has discovered that the 0.1 m spacing provides an adequate balance of memory utilization requirements and measurement error.

The system 110 may exclude any detections that are beyond a typical maximum trailer-dimension of 2.44 m×15.24 m.

Figure 14:
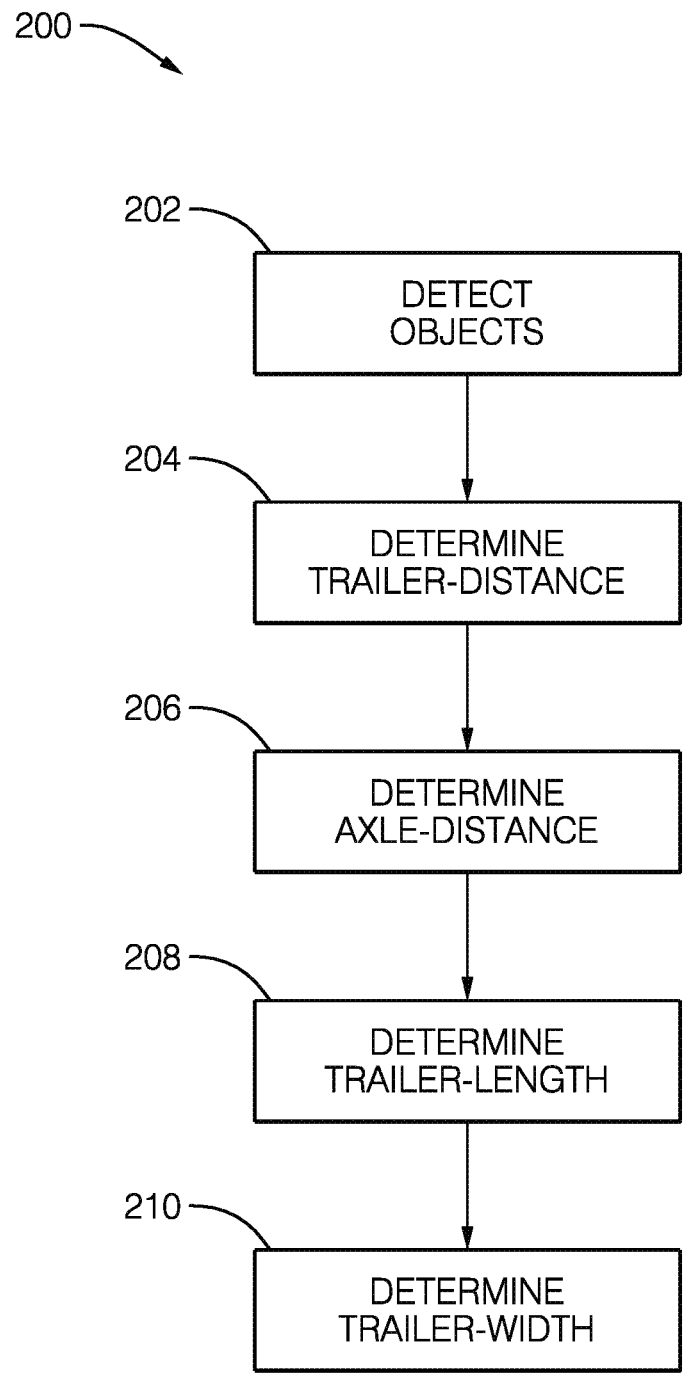
FIG. 14 is a flow chart of a detection method in accordance with yet another embodiment.

FIG. 14 is a flow chart that illustrates yet another embodiment of a detection method 200, hereafter referred to as the method 200, of operating a detection system 10, hereafter referred to as the system 10, and installed on a host-vehicle 12 towing a trailer 14. As will be described in more detail below, the method 200 in an improvement over other detection methods because the method 200 estimates a trailer-length 16 and trailer-width 18 based on detected targets by filtering out erroneous detections. The trailer 14 may be a cargo-trailer 14A that may be an enclosed-type with solid panels, or may be an open-type with an exposed frame. In the examples illustrated in FIGS. 1-5B the trailer 14 is the cargo-trailer 14A.

Step 202, DETECT OBJECTS, includes detecting, with a ranging-sensor 20, objects 26 proximate to the host-vehicle 12. FIG. 1 illustrates the system 10 that includes the ranging-sensor 20 and a controller-circuit 32 in communication with the ranging-sensor 20 that tracks the objects 26 as described above.

Step 204, DETERMINE TRAILER-DISTANCE, INCLUDES determining, with the controller-circuit 32, that the trailer 14 is being towed by the host-vehicle 12 and determining a trailer-distance 42. The controller-circuit uses the known method of zero range rate (ZRR) detections, as described above, to determine a distance 28 to a front 44 of a cargo-trailer 14A based on a first-group 46 of objects 26 illustrated in FIG. 4A.

Step 206, DETERMINE AXLE-DISTANCE, includes determining an axle-distance 56 between the front 44 of the cargo-trailer 14A and a trailer-axle 58 based on a second-group 60 of objects 26, as illustrated in FIG. 4B.

Step 208, DETERMINE TRAILER-LENGTH, includes determining, with the controller-circuit 32, a trailer-length 16 based on the trailer-distance 42 and the axle-distance 56. As described above, the trailer-length 16 (TL) is determined by a formula including the trailer-distance 42 (Lo), the axle-distance 56 (L1), and a constant 66 (C) using the following formula:

$$TL = Lo + L1 + L1*C$$

Step 210, DETERMINE TRAILER-WIDTH, includes determining, with the controller-circuit 32, a trailer-width 18. FIG. 5B illustrates a plot of the groups of the ZRR targets from FIG. 5A along the host-vehicle-lateral-axis 36 transverse to the host-vehicle-longitudinal-axis 34. The controller-circuit 32 further determines the trailer-width 18 of the cargo-trailer 14A by the distance 28 between a third-group 72 and a fourth-group 74 of objects 26 detected by the ranging-sensor 20.

Figure 15:
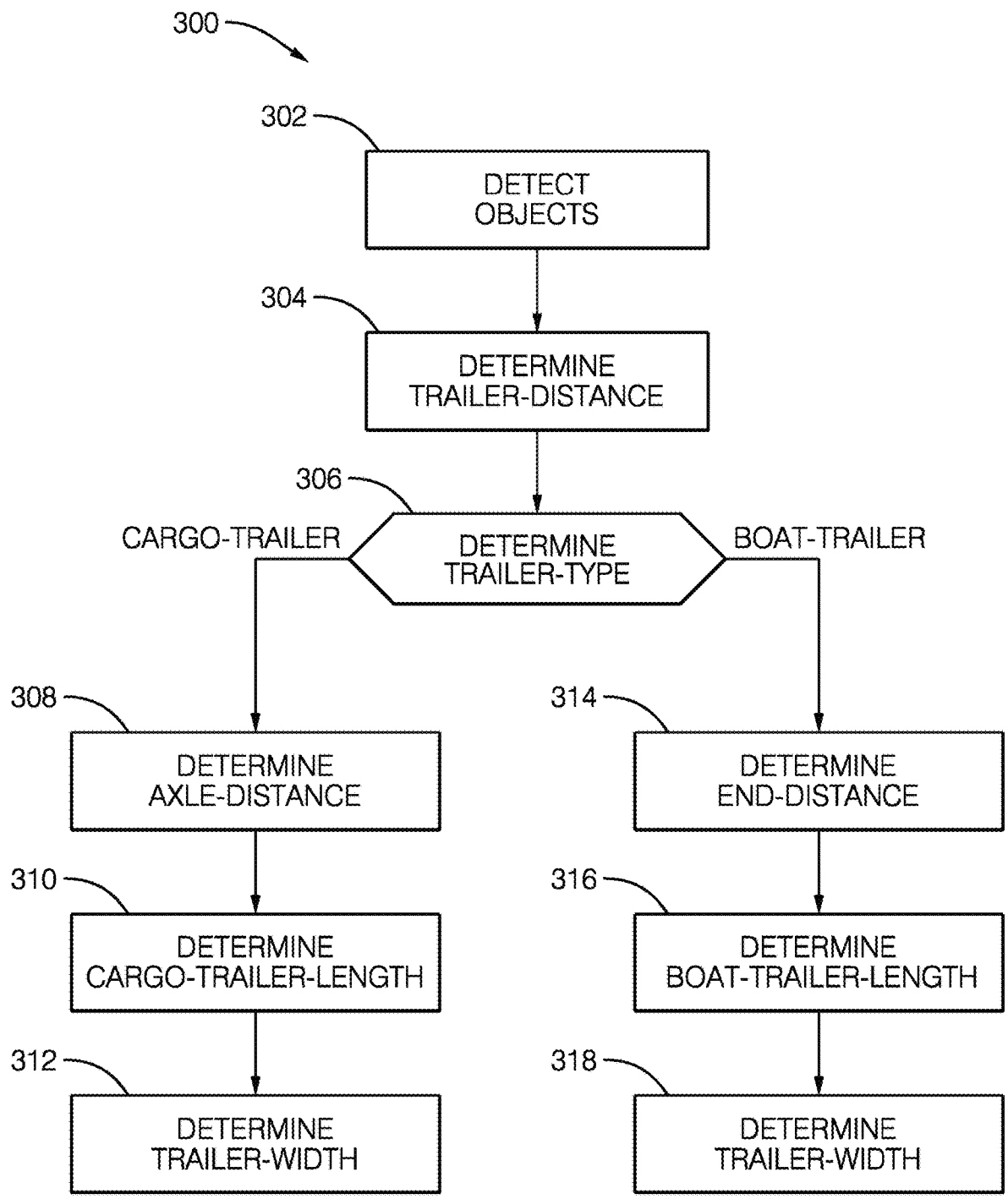
FIG. 15 is a flow chart of another detection method in accordance with yet another embodiment.

FIG. 15 is a flow chart illustrating yet another embodiment of a detection method 300, hereafter referred to as the method 300, of operating a detection system 110, hereafter referred to as the system 110, installed on a host-vehicle 112 towing a trailer 114. As will be described in more detail below, the system 110 in an improvement over other detection systems because the system 110 determines a trailer-type 113, a trailer-length 116 and a trailer-width 118 based on detected targets by filtering out erroneous detections. The trailer 114 may be a cargo-trailer 114A that may be an enclosed-type with solid panels, or may be an open-type with an exposed frame. The trailer 114 may also be a boat-trailer 114B. The boat-trailer 114B may, or may not, be carrying a boat, and may present a unique ranging-sensor-signal compared to the cargo-trailer 114A that may further assist in a determination of the type of trailer 114 being towed by the host-vehicle 112.

Step 302, DETECT OBJECTS, includes detecting, with a ranging-sensor 120, objects 126 proximate to the host-vehicle 112. FIG. 6 illustrates the system 110 that includes the ranging-sensor 120 and a controller-circuit 132 in communication with the ranging-sensor 120 that tracks the objects 126 as described above.

Step 304, DETERMINE TRAILER-DISTANCE, includes determining, with the controller-circuit 132, that the trailer 114 is being towed by the host-vehicle 112, and determining a trailer-distance 142 between the host-vehicle 112 and a front 144 of the trailer 114 based on a first-group 146 of objects 126 illustrated in FIG. 9A.

Step 306, DETERMINE TRAILER-TYPE, includes determining, with the controller-circuit 132, a trailer-type 113 being towed by the host-vehicle 112 based on a comparison of the trailer-distance 142 to a predetermined distance-threshold 155. The trailer-type 113 is characterized as a cargo-trailer 114A in accordance with a determination that the trailer-distance 142 is less than the distance-threshold 155 that is in a range of 2 m to 3 m. The trailer-type 113 is characterized as the boat-trailer 114B in accordance with the determination that the trailer-distance 142 is greater than the distance-threshold 155.

Step 308, DETERMINE AXLE-DISTANCE, includes determining, with the controller-circuit 132, an axle-distance 156 of the cargo-trailer 114A. In accordance with the determination that the trailer-type 113 is characterized as the cargo-trailer 114A, the controller-circuit 132 further determines the axle-distance 156 between the front 144 of the trailer 114 and a trailer-axle 158 based on a second-group 160 of objects 126 detected by the ranging-sensor 120, as illustrated in FIG. 9B.

Step 310, DETERMINE CARGO-TRAILER-LENGTH, includes determining, with the controller-circuit 132, a cargo-trailer-length 116A of the cargo-trailer 114A based on the trailer-distance 142 and the axle-distance 156. The cargo-trailer-length 116A (TL) is determined by a formula including the trailer-distance 142 (Lo), the axle-distance 156 (L1), and a constant 166 (C) using the following formula:

$$TL = Lo + L1 + L1*C$$

Step 312, DETERMINE TRAILER-WIDTH, includes determining, with the controller-circuit 132, a trailer-width 118 of the cargo-trailer 114A. FIG. 10B illustrates a plot of the groups of the ZRR targets from FIG. 10A along the host-vehicle-lateral-axis 136 transverse to the host-vehicle-longitudinal-axis 134. The controller-circuit 132 further determines the trailer-width 118 of the cargo-trailer 114A by the distance 128 between a third-group 172 and a fourth-group 174 of objects 126 detected by the ranging-sensor 120.

Step 314, DETERMINE END-DISTANCE, includes determining, with the controller-circuit 132, an end-distance 180 to an end of the boat-trailer 114B. FIG. 11A illustrates a plot of multiple radar-sensor 122 data acquisition cycles for the boat-trailer 114B that locate the ZRR targets along the host-vehicle-longitudinal-axis 134 and the host-vehicle-lateral-axis 136. FIG. 11B illustrates a plot of the groups of the ZRR targets from FIG. 11A along the host-vehicle-longitudinal-axis 134 only. In accordance with the determination that the trailer-type 113 is characterized as the boat-trailer 114B the controller-circuit 132 further determines the end-distance 180 to the end of the boat-trailer 114B based on a last-group 182 of objects 126 detected by the ranging-sensor 120. The last-group 182 is characterized by a last-distance 184 indicated by the ranging-sensor 120 and the controller-circuit 132 determines a boat-trailer-length 116B based on the end-distance 180, as illustrated in FIG. 12B.

Step 316, DETERMINE BOAT-TRAILER-LENGTH, includes determining, with the controller-circuit 132, the boat-trailer-length 116B. In accordance with the determination that the trailer-type 113 is characterized as the boat-trailer 114B, the controller-circuit 132 further determines the last-group 182 of objects 126 (group-F) determined by a last-detection-count 186 that is closer in magnitude to the peak-threshold 150 than to the noise-threshold 152 and is farthest in proximity to the host-vehicle 112, as illustrated in FIG. 12B.

Step 318, DETERMINE TRAILER-WIDTH, includes determining, with the controller-circuit 132, the trailer-width 118 of the boat-trailer 114B. FIG. 13B illustrates a plot of the groups of the ZRR targets from FIG. 13A along the host-vehicle-lateral-axis 136 transverse to the host-vehicle-longitudinal-axis 134. The controller-circuit 132 further determines the trailer-width 118 of the boat-trailer 114B by the distance 128 between the third-group 172 and the fourth-group 174 of objects 126 detected by the ranging-sensor 120.

The system 110 may exclude any detections that are beyond a typical maximum trailer-dimension of 2.44 m×15.24 m.

Accordingly, a detection system 10 (the system 10), a controller-circuit 32 for the system 10, and a method 200 of operating the system 10 are provided. The system 10 is an improvement over other detection systems because the system 10 estimates the trailer-length 16 and the trailer-width 18 by filtering out the phantom-objects 40.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

What is claimed is:

1. A system comprising:
   a controller circuit in communication with a ranging sensor configured to detect objects proximate to a host vehicle, the controller circuit configured to:
   perform a first detection count of the detected objects;
   determine a first group of objects of the detected objects;
   determine a first distance to the first group of objects;
   determine, utilizing the first distance, a trailer distance between the host vehicle and a front of a trailer;
   determine a second group of objects of the detected objects;
   determine a second distance to the second group of objects;
   determine, utilizing the second distance, an axle distance between the front of the trailer and a trailer axle;
   determine a trailer length based on the trailer distance and the axle distance;
   determine a peak threshold that represents detections of real objects by the ranging sensor; and
   determine a noise threshold that represents detections of phantom objects by the ranging sensor,
   wherein the peak threshold is greater than the noise threshold, the first group of objects being determined by a first detection count that is closer in magnitude to the peak threshold than to the noise threshold, and
   wherein the first group is closer in proximity to the host vehicle than the second group is to the host vehicle.

2. The system of claim 1, wherein the controller circuit is further configured to:
   determine, relative to a centerline of the host vehicle, a first lateral offset representing a third group of objects of the detected objects; and
   determine, relative to the centerline, a second lateral offset representing a fourth group of objects of the detected objects.

3. The system of claim 2, wherein the controller circuit is further configured to:
   determine a third distance between the third group of objects and the fourth group of objects; and
   determine, utilizing the determined third distance, a width of the trailer.

4. The system of claim 1, wherein the second group of objects is determined by a second detection count that is closer in magnitude to the peak threshold than to the noise threshold, and wherein the second group is second closest in proximity to the host vehicle.

5. A system comprising:
   a controller circuit in communication with a ranging sensor, the ranging sensor configured to detect objects proximate to a host vehicle, the controller circuit configured to:
   perform a first detection count of the detected objects;
   determine a first group of objects of the detected objects;
   determine a second group of objects of the detected objects;
   determine a first distance to the first group of objects;
   determine, utilizing the first distance, a trailer distance between the host vehicle and a front of a trailer;
   determine a trailer type being towed by the host vehicle based on the trailer distance;

determine a peak threshold that represents detections of real objects by the ranging sensor; and
determine a noise threshold that represents detections of phantom objects by the ranging sensor,
wherein the first group of objects being determined by a first detection count that is closer in magnitude to the peak threshold than to the noise threshold, and
wherein the first group is closer in proximity to the host vehicle than the second group is to the host vehicle.

6. The system of claim 5, wherein the controller circuit is further configured to:
determine, relative to a centerline of the host vehicle, a first lateral offset representing a third group of objects of the detected objects; and
determine, relative to the centerline, a second lateral offset representing a fourth group of objects of the detected objects.

7. The system of claim 6, wherein the controller circuit is further configured to:
determine a second distance between the third group of objects and the fourth group of objects; and
determine, utilizing the determined second distance, a width of the trailer.

8. The system of claim 5, wherein the controller circuit is further configured to:
determine a second distance to a second group of objects; and
determine, utilizing the second distance, an axle distance between the front of the trailer and a trailer axle.

9. The system of claim 8, wherein the controller circuit is further configured to:
determine, utilizing the determined trailer distance and the determined axle distance, a trailer length.

10. The system of claim 8, wherein the controller circuit is further configured to:
perform a second detection count of the detected objects.

11. The system of claim 10, wherein the second group of objects is determined by a second detection count that is closer in magnitude to the peak threshold than to the noise threshold, and wherein the second group is second closest in proximity to the host vehicle.

12. The system of claim 5, wherein the controller circuit is further configured to:
determine if the trailer distance is less than a distance threshold, and
wherein, responsive to determining that the trailer distance is less than a distance threshold, the controller circuit determines that the trailer type is a cargo trailer.

13. The system of claim 5, wherein the controller circuit is further configured to:
determine if the trailer distance is greater than a distance threshold, and
wherein, responsive to determining that the trailer distance is greater than a distance threshold, the controller circuit determines that the trailer type is a boat trailer.

14. The system of claim 13, wherein the ranging sensor is further configured to detect a centerline of the host vehicle.

15. The system of claim 14, wherein the controller circuit is further configured to:
determine, relative to the centerline, a first lateral offset representing a third group of objects of the detected objects;
determine, relative to the centerline, a second lateral offset representing a fourth group of objects of the detected objects;
determine a second distance between the third group of objects and the fourth group of objects; and
determine, utilizing the determined second distance, a width of the trailer.

16. The system of claim 13, wherein the controller circuit is further configured to:
determine a last distance to a last group of objects of the detected objects;
determine, utilizing the last distance, an end distance to an end of the trailer based on the last group of objects; and
determine, utilizing the determined end distance, a trailer length.

17. A method comprising:
receiving, by a controller circuit in communication with a ranging sensor configured to detect objects proximate to a host vehicle, data indicative of detected objects;
performing a first detection count of the detected objects;
determining, by the controller circuit, a first group of objects of the detected objects;
determining, by the controller circuit, a first distance to the first group of objects;
determining, by the controller circuit utilizing the first distance, a trailer distance between the host vehicle and a front of a trailer;
determining, by the controller circuit, a second group of objects of the detected objects;
determining, by the controller circuit, a second distance to the second group of objects;
determining, by the controller circuit utilizing the second distance, an axle distance between the front of the trailer and a trailer axle;
determining, by the controller circuit, a trailer length based on the trailer distance and the axle distance;
determining, by the controller circuit, a peak threshold that represents detections of real objects in the detected objects by the ranging sensor; and
determining, by the controller circuit, a noise threshold that represents detections of phantom objects in the detected objects by the ranging sensor, the peak threshold is greater than the noise threshold,
wherein the first group of objects being determined by a first detection count that is closer in magnitude to the peak threshold than to the noise threshold, and
wherein the first group is closer in proximity to the host vehicle than the second group is to the host vehicle.

18. The method of claim 17, further comprising:
determining, by the controller circuit, relative to a centerline of the host vehicle, a first lateral offset representing a third group of objects of the detected objects; and
determining, by the controller circuit, relative to the centerline, a second lateral offset representing a fourth group of objects of the detected objects.

19. The method of claim 18, further comprising:
determining, by the controller circuit, a third distance between the third group of objects and the fourth group of objects; and
determining, by the controller circuit, utilizing the determined third distance, a width of the trailer.

20. The method of claim 17, further comprising:
performing a second detection count of the detected objects,
wherein the second group of objects is determined by a second detection count that is closer in magnitude to the peak threshold than to the noise threshold, and
wherein the second group is second closest in proximity to the host vehicle.

* * * * *